US012508832B2

(12) United States Patent
Hofer

(10) Patent No.: US 12,508,832 B2
(45) Date of Patent: Dec. 30, 2025

(54) OPTICALLY VARIABLE SECURITY ELEMENT, AND VALUE DOCUMENT CONTAINING THE OPTICALLY VARIABLE SECURITY ELEMENT

(71) Applicant: GIESECKE+DEVRIENT CURRENCY TECHNOLOGY GMBH, Munich (DE)

(72) Inventor: Moritz Hofer, Munich (DE)

(73) Assignee: GIESECKE+DEVRIENT CURRENCY TECHNOLOGY GMBH, Munich (DE)

( * ) Notice: Subject to any disclaimer, the term of this patent is extended or adjusted under 35 U.S.C. 154(b) by 0 days.

(21) Appl. No.: 18/554,865

(22) PCT Filed: Mar. 8, 2022

(86) PCT No.: PCT/EP2022/025086
§ 371 (c)(1),
(2) Date: Oct. 11, 2023

(87) PCT Pub. No.: WO2022/218569
PCT Pub. Date: Oct. 20, 2022

(65) Prior Publication Data

US 2024/0190160 A1 Jun. 13, 2024

(30) Foreign Application Priority Data

Apr. 13, 2021 (DE) ..................... 10 2021 001 898.2

(51) Int. Cl.
*B42D 25/324* (2014.01)
*B42D 25/29* (2014.01)
*B42D 25/36* (2014.01)

(52) U.S. Cl.
CPC ........... *B42D 25/324* (2014.10); *B42D 25/29* (2014.10); *B42D 25/36* (2014.10)

(58) Field of Classification Search
CPC ....... B42D 25/324; B42D 25/29; B42D 25/36
(Continued)

(56) References Cited

U.S. PATENT DOCUMENTS 10,525,759 B2 1/2020 Rahm et al.
10,632,779 B2 4/2020 Holmes
(Continued)

FOREIGN PATENT DOCUMENTS

CN 103260894 A 8/2013
CN 110337372 A 10/2019
(Continued)

OTHER PUBLICATIONS

German Search Report from corresponding German Patent Application No. DE102021001898.2, Dec. 14, 2021.
(Continued)

*Primary Examiner* — Justin V Lewis
(74) *Attorney, Agent, or Firm* — Workman Nydegger

(57) ABSTRACT

An optically variable security element contains a motif region, and has a main motif shape that is visible to a viewer in the motif region at at least a first viewing angle. The optically variable main motif includes substructures that are visible to the viewer. The substructures are sub-motifs that are visible to the viewer and have a sub-motif shape. The sub-motifs have the same sub-motif shape, and the sub-motif shape corresponds to the main motif shape.

20 Claims, 11 Drawing Sheets

(58) Field of Classification Search
USPC .................................. 283/72, 74, 94, 98, 901
See application file for complete search history.

(56) References Cited

U.S. PATENT DOCUMENTS

| | | | | |
|---|---|---|---|---|
| 11,623,465 | B2 | 4/2023 | Scherer et al. | |
| 11,654,709 | B2 | 5/2023 | Scherer et al. | |
| 2004/0130760 | A1 * | 7/2004 | Schilling .............. | B42D 25/328 359/2 |
| 2008/0258456 | A1 | 10/2008 | Rahm et al. | |
| 2009/0322071 | A1 * | 12/2009 | Dichtl .................. | B42D 25/342 283/70 |
| 2015/0231912 | A1 | 8/2015 | Yoon et al. | |
| 2018/0022143 | A1 * | 1/2018 | Borgsmüller ........ | B42D 25/324 283/91 |
| 2018/0201044 | A1 | 7/2018 | Holmes | |
| 2019/0170917 | A1 | 6/2019 | Tashiro et al. | |
| 2021/0268825 | A1 | 9/2021 | Scherer et al. | |
| 2021/0283939 | A1 | 9/2021 | Scherer et al. | |
| 2023/0057603 | A1 | 2/2023 | Fuhse | |

FOREIGN PATENT DOCUMENTS

| | | | |
|---|---|---|---|
| CN | 112118965 | A | 12/2020 |
| DE | 102005061749 | A1 | 7/2007 |
| DE | 102013021806 | A1 | 6/2015 |
| DE | 102018005447 | A1 | 1/2020 |
| DE | 102020000732 | A1 | 8/2021 |
| WO | 2012084182 | A2 | 6/2012 |
| WO | 2018184715 | A1 | 10/2018 |
| WO | 2018197044 | A1 | 11/2018 |
| WO | 2020011390 | A1 | 1/2020 |
| WO | 2020011391 | A1 | 1/2020 |

OTHER PUBLICATIONS

International Search Report from corresponding PCT Application No. PCT/EP2022/025086, Jun. 14, 2022.

Chinese Office Action from Corresponding Chinese Patent Application No. CN202280028235.4, Jun. 12, 2025.

* cited by examiner

OPTICALLY VARIABLE SECURITY ELEMENT, AND VALUE DOCUMENT CONTAINING THE OPTICALLY VARIABLE SECURITY ELEMENT

TECHNICAL FIELD OF THE INVENTION

The invention relates to an optically variable security element having a motif visible to an observer, which comprises visible substructures as submotifs. Furthermore, the invention relates to a value document having the optically variable security element.

TECHNICAL BACKGROUND

Optically variable security elements, for example on banknotes, are known from the prior art. Different optical impressions result for an observer in this case as a function of an observation angle. Different observation angles can be achieved in that the optically variable element or a value document having the optically variable element is tilted around an axis, while the observation direction of the observer and the illumination direction of the optically variable element remain unchanged.

WO 2020/011391 A1 and WO 2020/011390 A1 relate to relief structures arranged on two different height levels, which are each provided with a color coating. Therefore, at least two motifs and/or effects of the respective micromirror relief structure having the two (or more) different chromatic colors of the color coating are generated independently of one another depending on the observation angle. Each of the two-color coatings—or possibly an intermediate layer—could be provided, for example printed on, in regions in different chromatic and/or achromatic colors (or grayscales). Such multicolored color coatings are usable in particular for reflective relief structures or refractive relief structures. In addition, such a multicolored color coating, which is provided locally in different colors, can also be used in DE 10 2020 000 732 A1, which uses a highly refractive coloring HRI layer. It can also be provided there as an intermediate layer or as the layer following the (first or second) relief.

WO 2012/084182 A2 relates to an optically variable security element having a motif, wherein the motif contains multiple substructures that extend over the motif and that each include alternatingly light and dark subregions. Motifs are formed in WO 2012/084182 A2 at a specific observation angle by perceptible substructures, which are not motifs themselves. The substructures enable a good contrast in a large solid angle, a facilitated authenticity check by an observer or user, and security from forgery of a value document having the security element can be further improved.

SUMMARY OF THE INVENTION

The invention is based on the object of providing an optically variable security element which enables improved security from forgery and the authenticity of which is easy for an observer to check.

An optically variable security element comprises a motif region. An optically variable main motif having a main motif shape is visible to an observer in the motif region at at least one first observation angle. The optically variable main motif comprises substructures that are visible to the observer. The substructures are submotifs visible to the observer and having a submotif shape. The submotifs have the same submotif shape. The submotif shape corresponds to the main motif shape.

Security elements can be applied to an object to enable the authenticity of the object to be checked. Such an object can be, for example, a check, a bankcard, a document, a certificate, an identification card, a piece of clothing (a label of a piece of clothing), or a banknote.

The authenticity of a value document having the security element may be recognized particularly well and easily by a formation of the main motif by submotifs which correspond to the main motif. At first glance, for example, a geometrical motif, e.g. a square or a triangle, or another motif, e.g. an apple, may be recognized as the main motif by the observer. If the observer also finds a corresponding motif again in the submotifs forming the main motif, they can check the authenticity of the value document easily and reliably. Motifs can be perceived easily by an observer and compared to other motifs, even if they have different sizes. For example, in the case of line-like substructures of WO 2012/084182 A2, it is more difficult for the observer to assess whether the perceived substructure corresponds to the structure intended by the producer, so that an authenticity check by the observer is only given to a limited extent.

The security element can convey an optical impression to an observer (a human) without aids, so that the observer can perceive the authenticity of the object provided with the security element optically without aids. An optical security element is particularly suitable for simple or everyday authenticity checks by a human. The optical impression can be perceptible in a wavelength range from 400 nm to 780 nm.

With an optically variable security element, different optical impressions result for the observer, who wishes to carry out an authenticity check, depending on the observation angle, the observation direction, the side of the security element, or the type of observation (top view or through view). The security element can thus convey a first optical impression at a first observation angle and convey a second optical impression at a second observation angle, wherein the first optical impression and the second optical impression are different.

The security element can be applied to the object to be secured, e.g. a banknote or a precursor of a banknote, for example, as a patch (spot) or strip. The security element can be designed as planar. The area of the security element can be at most 5000 $mm^2$, preferably at most 2500 $mm^2$, more preferably at most 1500 $mm^2$, more preferably at most 1000 $mm^2$.

The security element can have a length at least five times, preferably at least ten times greater than the width. The security element can have a width of at least 1 mm.

The security element can be provided as a thread, as a strip, or as a patch.

A security paper can be a precursor of a value document. A security paper can be a paper which is not yet completely printed. A security paper can comprise at least one security element, at least one window, and/or at least one security feature.

The security element can be applied to a value document or a security paper. The security element can extend from one side of the value document or the security paper to another side of the value document or the security paper. The sides can be opposite sides. The security element can have a length which is equal to the width or height of the value document or the security paper.

The security element can be at least partially introduced into the value document or into the security paper. The security element can be introduced into the value document or the security paper so that sections of the security element are visible by an observer and sections of the security element are not visible by the observer. The security element can be introduced into the value document or the security paper so that sections of the security element are covered by the value document, or the security paper and sections of the security element are not covered by the value document or the security paper.

A motif is particularly readily suitable as an optical impression. The motif can have a motif shape perceptible to the observer here. A motif shape is, for example, a circle, a quadrangle, or an apple.

The motif shape can be the shape of a geometrical figure. In particular, the motif shape is a circle or a polygon. The polygon can be a triangle, a quadrangle, in particular a rectangle, a rhombus, or a square, or a hexagon.

The motif can have a contour. The contour can be an outer contour. The motif can be (optically) delimited in relation to its surroundings by the contour. The contour can enclose an inner section of the motif.

The motif can be visible in a motif region of the security element. The motif region can have an area which is equal to the area of the security element. The area of the motif region can be at most 95%, preferably at most 90%, more preferably at most 75%, more preferably at most 50%, more preferably at most 30%, more preferably at most 20%, of the area of the security element.

A main motif can be the motif having a greatest perceptible extension of motifs in the motif region.

For example, the security element can define an x-y plane having an x direction and a y direction. The main motif can have, in comparison to all perceptible motifs, the greatest extension in one direction. The main motif can have, in comparison to all perceptible motifs, the greatest extension in the x direction. Alternatively or additionally, the main motif can have, in comparison to all perceptible motifs, the greatest extension in the y direction. The main motif can have, in comparison to all perceptible motifs, the greatest extension in the x direction and y direction. The main motif can have, in comparison to all perceptible motifs, the greatest area in the x-y plane.

The at least one observation angle can be in a first observation angle range. The observation angle range can comprise a range of at most 40°, preferably at most 30°, more preferably at most 20°, more preferably at most 10°.

The main motif is optically variable. Different optical impressions of the main motif can thus result for the observer depending on the observation angle. Alternatively or additionally, different optical impressions of the main motif can thus result for the observer depending on the observation direction. Alternatively or additionally, different optical impressions of the main motif can thus result for the observer depending on the side of the security element. Alternatively or additionally, different optical impressions of the main motif can thus result for the observer depending on the type of the observation (top view or through view).

Visible substructures of the main motif can be individually optically perceptible by the observer. A substructure can be individually optically perceptible if it is distinguishable by human eyes from a further structure.

The main motif can comprise at least two, preferably at least three, more preferably at least four, more preferably at least five, more preferably at least ten, more preferably at least fifteen, more preferably at least twenty, substructures.

Each of the substructures can have a smaller perceptible extension in the motif region than the main motif.

Each of the substructures can have a smaller area than the main motif in an x-y plane. In particular, the area of each of the substructures can be at most 50%, preferably at most 25%, more preferably at most 15%, more preferably at most 10%, more preferably at most 7%, more preferably at most 5%, more preferably at most 3%, of the area of the main motif.

In general, an area of a motif can be the area surrounded (enclosed) by the contour of the motif, in particular in an x-y plane of the security element. The contour can be an outer contour.

In general, an area of a structure can be the area surrounded (enclosed) by the contour of the structure, in particular in an x-y plane of the security element. The contour can be an outer contour.

In general, a motif can have a brightly perceptible contour. An inner section of the motif surrounded by the contour can be darkly perceptible.

A brightly perceptible section displays a higher relative reflected light intensity at the given observation angle upon non-diffuse illumination, for example, by the sun or a point light source, than a darkly perceptible section.

The relative reflected light intensity is a ratio of reflected light intensity to incident light intensity. If light from a light source is completely reflected, the relative reflected light intensity is 100%.

In a brightly perceptible section, the relative reflected light intensity can be greater by at least 5%, preferably at least 10%, more preferably at least 20%, more preferably at least 30%, more preferably at least 40%, more preferably at least 50% than the relative reflected light intensity in a darkly perceptible section. The percentage specifications can be percentage points.

The substructures of the main motif are submotifs having a submotif shape. Because a main motif is perceptible in the motif region of the security element which comprises perceptible (visible) submotifs, the authenticity of the security element may be checked particularly well by an observer.

The submotifs have the same submotif shape. In this case, at least two of all submotifs of the submotifs of the main motif, at least 50% of all submotifs of the submotifs of the main motif, or of all submotifs of the submotifs of the main motif can have the same shape as the main motif (main motif shape).

Motifs having the same motif shapes may be able to be brought into congruence. In particular, motifs having the same motif shapes may be able to be brought into congruence without a change of the motifs, for example, without an enlargement or without a central stretching.

The submotif shape of the submotifs corresponds to the main motif shape of the main motif. In this case, the submotif shape of at least two of all submotifs of the submotifs of the main motif, at least 50% of all submotifs of the submotifs of the main motif, or of all submotifs of the submotifs of the main motif can correspond to the shape of the main motif (main motif shape).

Two motifs having corresponding shapes may be able to be brought into congruence by an enlargement or by a central stretching of one of the motifs.

For example, the main motif shape and the submotif shape can each be a square. The side lengths of the square submotif can be less than the side lengths of the square main motif shape. The submotif can be brought into congruence with the main motif by an enlargement or central stretching.

All side ratios and angle ratios of a shape can be maintained upon the enlargement or the central stretching.

In general, a congruence of two motifs can be given if the areas of the motifs, for example, the areas of the motifs surrounded by the respective contour of the motif, may be brought into congruence by at least 80%, preferably by at least 85%, more preferably by at least 90%, more preferably by at least 92%, more preferably by at least 94%, more preferably by at least 96%, more preferably by at least 98%, more preferably by at least 99%, more preferably by at least 99.5%, more preferably by at least 99.8%, more preferably completely.

The optically variable main motif can have a contour. The contour can be an outer contour. The contour can surround or enclose an inner section of the optical variable main motif.

The contour of the main motif can be visible to the observer due to alternatingly light and dark sections. The contour of the main motif can also be visible to the observer due to a continuously bright section.

The bright sections of the contour of the main motif or the bright section of the contour of the main motif can be bright sections of the submotifs.

The alternatingly bright and dark sections can have a different extension along the contour. For example, a bright section can have a greater length extension than a following dark section. A dark section can also have a greater length extension than a following bright section.

The alternatingly bright and dark sections can have an equal extension along the contour. For example, a bright section can have an equal length extension as a following dark section.

The extensions of alternatingly bright and dark sections can be periodic along the contour. For example, a first bright section can have a first length extension, a following first dark section can have a second length extension, a following second bright section can have a third length extension, and a following second dark section can have a fourth length extension. The first length extension of the first bright section can be equal to the third length extension of the second bright section. The second length section of the first dark section can be equal to the fourth length extension of the second dark section. The first length extension of the first bright section can be different from the second length extension of the first dark section. The first length extension of the first bright section can be different from the fourth length extension of the second dark section. The third length extension of the second bright section can be different from the second length extension of the first dark section. The third length extension of the second bright section can be different from the fourth length extension of the second dark section.

The submotifs can be visible along the contour of the main motif.

A gap can be located between the submotifs along the contour of the main motif. The submotifs along the contour can be spaced apart or cannot contact one another. The submotifs can contact one another along the contour of the main motif. No gap can be provided between the submotifs along the contour of the main motif.

A length extension of a gap can be the shortest distance between two submotifs in one direction, in particular in the x direction or in the y direction.

The contour of the main motif can be formed at least in sections, preferably completely, by the submotifs. The contour of the main motif can be formed in sections by the submotifs.

Sections of the submotifs can form the contour of the main motif. The sections of the submotifs which have the greatest distance from an inner section of the main motif preferably form the contour of the main motif.

The contour of the main motif can be formed so that the contour encloses the largest possible area and is formed from sections of the submotifs. The course of the submotif sections from which the contour is formed can be continued linearly or with the same curvature between submotifs.

If the observation angle is changed, the main motif preferably displays a movement effect.

In a movement effect, the main motif can in particular change its size, change its shape, change its position, and/or rotate depending on the observation angle.

The main motif preferably changes its size upon change of the observation angle in an observation angle range.

An observation angle range can be at most 40°, preferably at most 30°, more preferably at most 20°, more preferably at most 10°.

The optically variable main motif can be visible with a smaller area at at least one second observation angle than at the first observation angle. The first observation angle and the second observation angle can be different observation angles.

The first observation angle and the second observation angle can be in the observation angle range.

A transition from the first observation angle to the second observation angle can be able to be carried out by tilting the security element around an axis which lies in a plane defined by the security element.

The area of the main motif can be an area surrounded or enclosed by the main contour.

A movement effect can be perceptible by the observer due to the tilting of the security element, in particular in the observation angle range. The movement effect can act continuously.

The area of the optically variable main motif can be perceptible as continuously shrinking due to continuous tilting of the security element, in particular in the observation angle range.

The main motif can comprise visible submotifs at the second observation angle. In general, the main motif can comprise visible submotifs at further observation angles which are different from one another.

The area of each of the submotifs at the second observation angle can be equal to the area of each of the submotifs at the first observation angle. The area of each of the submotifs at a further observation angle can be equal to the area of each of the submotifs at a prior observation angle. In this case, at least three, preferably at least four, more preferably at least five, more preferably at least ten, different, in particular second, observation angles can be observed.

The area of each of the submotifs at the second observation angle can be less than the area of each of the submotifs at the first observation angle. The area of each of the submotifs at a further observation angle can be less than the area of each of the submotifs at a prior observation angle. In this case, at least three, preferably at least four, more preferably at least five, more preferably at least ten, different, in particular second, observation angles can be observed.

The area of a submotif can be defined by a contour of the submotif. The contour of the submotif can surround or enclose the area.

The contour of the submotif can in principle be formed analogously to the contour of the main motif. For this purpose, a submotif can take the place of the main motif and sub-submotifs can take the place of submotifs. Sub-submotifs can be visible to the observer, they are alternatively only recognizable to the observer after enlargement (magnification).

The number of the submotifs at the second observation angle can be equal to the number of the submotifs at the first observation angle. The number of each of the submotifs at a further observation angle can be equal to the number of each of the submotifs at a prior observation angle. In this case, at least three, preferably at least four, more preferably at least five, submotifs can be visible at the first and/or second observation angle.

The number of the submotifs at the second observation angle can be less than the number of the submotifs at the first observation angle. The number of each of the submotifs at a further (second) observation angle can be less than the number of each of the submotifs at a prior observation angle. In this case, at least three, preferably at least four, more preferably at least five, submotifs can be visible at the first and/or second observation angle.

A number of submotifs is visible at the first and/or second observation angle to display the main motif. The number of the submotifs of the main motif can be at most 30, preferably at most 24, more preferably at most 16. Preferably, between 3 and 30 submotifs, preferably between 3 and 24 submotifs, more preferably between 3 and 16 submotifs can be visible at the first and/or second observation angle. This number takes into consideration that there can be more than one main motif or a plurality of main motifs on a security element.

A size ratio between the main motif and each of the submotifs can be equal (constant) at different observation angles. The size ratio can be integer or non-integer. The size ratio can be integer and greater than 1. The size ratio can be at least 3, preferably at least 4, more preferably at least 5, more preferably at least 6. The size ratio is preferably in a range of 3 to 10, preferably of 3 to 8, more preferably of 4 to 6.

The size ratio can be 4.0±0.5, 5.0±0.5, or 6.0±0.5, preferably 4.0±0.3, 5.0±0.3, or 6.0±0.3, more preferably 4.0±0.2, 5.0±0.2, or 6.0±0.2, more preferably 4.0±0.1, 5.0±0.1, or 6.0±0.1.

A size ratio between the main motif and each of the submotifs can be variable (inconstant) at various observation angles.

The size ratio can be defined by $(n-i*c)$: 1. Therein, n can be integer and/or i can be integer. c specifies the observation angle, with $c=0, 1, 2, \ldots$ for the first, second, further second . . . of the observation angles. For example, at a first observation angle c is equal to 0, at a second observation angle c is equal to 1, at a third observation angle c is equal to 2, etc. There can be a constant angle difference between the observed observation angles.

- i can be between 0.5 and 5.0, preferably between 0.5 and 4.0, more preferably between 0.5 and 3.5, more preferably between 0.5 and 2.5, more preferably between 0.5 and 1.5, more preferably between 0.7 and 1.3, more preferably between 0.9 and 1.1. Particularly preferably, i is equal to 1.
- n can be at least 3, preferably at least 4, more preferably at least 5, more preferably at least 6. n can be in a range of 3 to 10, preferably of 3 to 8, more preferably of 4 to 6. n can be 4.0±0.5, 5.0±0.5, or 6.0±0.5, preferably 4.0±0.3, 5.0±0.3, or 6.0±0.3, more preferably 4.0±0.2, 5.0±0.2, or 6.0±0.2, more preferably 4.0±0.1, 5.0±0.1, or 6.0±0.1.

In general, the size ratio can be determined by a ratio of a (maximum) extension of the main motif in one direction (for example x direction or y direction) in a plane defined by the security element to a (maximum) extension of a submotif in the same direction. The size ratio can be a ratio of the circumference of the main motif to the circumference of a submotif, in particular to each of the submotifs. The circumference can be determined by the respective contour.

The main motif shapes at different observation angles can correspond to one another. The main motif can have a main motif shape at a first observation angle and the main motif can have a main motif shape at a second observation angle. The main motif shape at the first observation angle can correspond to the main motif shape at the second observation angle.

Each of the submotifs can comprise sub-submotifs. Each of the submotifs can comprise a contour. The contour can surround an inner section of the respective submotif.

The sub-submotifs can be visible along the contour of the respective submotif or can be recognizable after enlargement.

The contour of the respective submotif can be formed by the sub-submotifs.

Each of the sub-submotifs can have a sub-submotif shape. The sub-submotif shape can correspond to the submotif shape. The sub-submotif shape can correspond to the main motif shape.

The security element can define an x-y plane. The x-y plane can comprise an x axis and a y axis. A transition from the first observation angle to the second observation angle can be able to be carried out by tilting the optically variable security element around the x axis. A transition from a third, in particular each of the first, second, or further second, observation angle to a fourth observation angle can be able to be carried out by tilting the optically variable security element around the y axis.

Preferably, the main motif will change upon tilting around the x axis, but will not change upon tilting around the y axis. The observation angle dependence of the submotifs is then selected for the y axis so that the main motif represented by the submotifs is visible unchanged overall for the observer (in spite of change of the submotifs).

At the third observation angle, the submotif can have a size and at the fourth observation angle, the submotif can have a size, wherein the size of the submotif at the third observation angle can be different from the size of the submotif at the fourth observation angle. The size of the submotif at the third observation angle is preferably greater than the size of the submotif at the fourth observation angle.

At the third observation angle, the submotif can have a ratio of bright to dark sections and at the fourth observation angle, the submotif can have a ratio of bright to dark sections, wherein the ratio of bright to dark sections of the submotif at the third observation angle can be different from a ratio of bright to dark sections of the submotif at the fourth observation angle. The ratio of bright to dark sections of the submotif at the third observation angle is preferably greater than the ratio of bright to dark sections of the submotif at the fourth observation angle.

At the third observation angle, the submotif can have an area and at the fourth observation angle, the submotif can have an area. The area of the submotif at the third observation angle can be equal to the area of the submotif at the fourth observation angle. The submotif preferably changes upon tilting around the y axis, for example, in size, location, or degree of rotation, but its area remains unchanged. Submotifs preferably change upon tilting around the y axis, without the total area of the submotifs changing. Since the area of the submotifs (thus the brightly illuminating sections) determines the brightness with which the main motif is visible, this variant is particularly advantageous.

A movement effect of several of the submotifs can be visible by an observer due to tilting around the y axis. A movement effect of the majority of the submotifs can be visible by an observer due to tilting around the y axis. A movement effect of each of the submotifs can be visible by an observer due to tilting around the y axis.

The movement effect of the submotifs can be identical to the movement effect of the main motif. The movement effect can be a size change, for example a pump effect, or an increase of the thickness of the contour of the respective submotif. Alternatively, submotifs can be visible moving along the contour of the main motif within the movement effect.

In a pump effect, the motif (submotif) can be visible alternately larger and smaller due to tilting around an axis in one direction. In a pump effect, a size decrease and/or size increase can be relatively minor in comparison to other size changes.

Upon tilting around the second axis, the change of the submotifs is preferably designed so that the observer sees an unchanged main motif.

The first observation angle is different from the second observation angle. The third observation angle is different from the fourth observation angle. The first, second, third, and fourth observation angles can be different observation angles.

The optically variable security element can comprise an arrangement made up of microreflectors reflective in a directed manner. The microreflectors are preferably non-diffractive microreflectors. The microreflectors can be micromirrors. The microreflectors are preferably micromirrors each having an inclined surface.

The optically variable security element can comprise an arrangement of microreflectors which generate the main motif and the submotifs for the observer depending on the observation angle. The microreflectors can be micromirrors.

The arrangement of microreflectors can comprise a relief structure having reflection-increasing coating.

The arrangement of microreflectors can comprise a relief structure having a metal coating.

The arrangement of microreflectors can comprise an embossed embossing lacquer layer.

A dimension of each of the microreflectors, in particular a maximum width of each of the microreflectors, can be between 2 μm and 300 μm, preferably between 3 μm and 100 μm, more preferably between 5 μm and 50 μm.

The microreflectors, in particular the micromirrors, can be designed as described in DE 10 2005 061 749 A1. The microreflectors, in particular the micromirrors, can be created or produced as described in DE 10 2005 061 749 A1.

The microreflectors can be inclined or tilted in relation to a plane (x-y plane) defined by the security element. Light from a light source can thus be reflected by different microreflectors, which are inclined differently in relation to the plane, at different strengths to a point. By way of a suitable selection of the tilt of different microreflectors, a motif can be visible by an observer by a reflection of light. Different motifs can especially be visible by the observer depending on the observation angle.

The microreflectors can be provided with a reflective or reflection-increasing coating. A metallic or highly refractive coating can be applied to the microreflectors. A (color-tilting or color-filtering) multilayer system can be applied to the microreflectors. The microreflectors can be provided with a liquid crystal coating.

Microreflectors can become formed or be formed, for example, by an embossing method in an embossable layer, for example, in an embossing lacquer layer. The embossable layer can become applied or be applied to a substrate. The embossable layer can be a film, in particular a thermoplastic film. The embossable layer can be a radiation-curable lacquer. The embossable layer can have multiple partial layers.

The microreflectors can be overlaid with structures, the dimensions of which are preferably equal to or greater than one quarter of the wavelength of visible light. The structures can be designated as sub-wavelength structures.

Sub-wavelength structures can be periodic structures, the period of which is in the range from 50 nm to 500 nm, preferably from 100 nm to 400 nm. Sub-wavelength structures can be aperiodic structures, the structure width of which is in the range from 50 nm to 500 nm, preferably from 100 nm to 400 nm. A motif may thus be displayed in color, in particular as multicolor. The color display can be settable or selectable independently for each of the microreflectors. In particular, a color change can be achievable as a color effect depending on observation angle. A color effect depending on observation angle can be combined with a movement effect, in particular with a movement effect described herein.

The submotifs can have a maximum width of at most 5.0 mm, in particular at the first observation angle. The maximum width of the submotifs is preferably at most 3.0 mm, more preferably at most 2.0 mm, more preferably at most 1.0 mm. The maximum width of the submotifs can be at least 100 μm, preferably at least 200 μm. The maximum width of the submotifs can be between 100 μm and 5.0 mm, preferably between 100 μm and 2.0 mm, more preferably between 200 μm and 2 mm, more preferably between 300 μm and 1.5.

The submotifs can be optically variable submotifs. Alternatively or additionally, the sub-submotifs can be optically variable sub-submotifs.

A value document can comprise each of the security elements disclosed herein. The value document can be a check, a bankcard, a document, a certificate, an identification card, a piece of clothing (a label of a piece of clothing), or a banknote.

The value document can comprise at least one further security element. The further security element can be a security element perceptible by an observer. The further security element can be a security element not perceptible by an observer. The further security element can be a security element perceptible by a machine.

The value document can comprise at least one security feature. The security feature can be printed on the value document. The security feature can be incorporated in a substrate of the value document. The security feature can be a security feature perceptible by an observer. The security feature can be a security feature not perceptible by an observer. The security feature can be a security feature perceptible by a machine.

BRIEF DESCRIPTION OF THE FIGURES

The invention or further embodiments and advantages of the invention are explained in more detail hereinafter on the basis of figures, wherein the figures solely describe exemplary embodiments of the invention. Identical components in the figures are provided with identical reference signs.

The figures are not to be viewed as to scale, individual elements of the figures can be shown exaggeratedly large or exaggeratedly simplified.

DETAILED DESCRIPTION OF EXEMPLARY EMBODIMENTS

Figure 1:
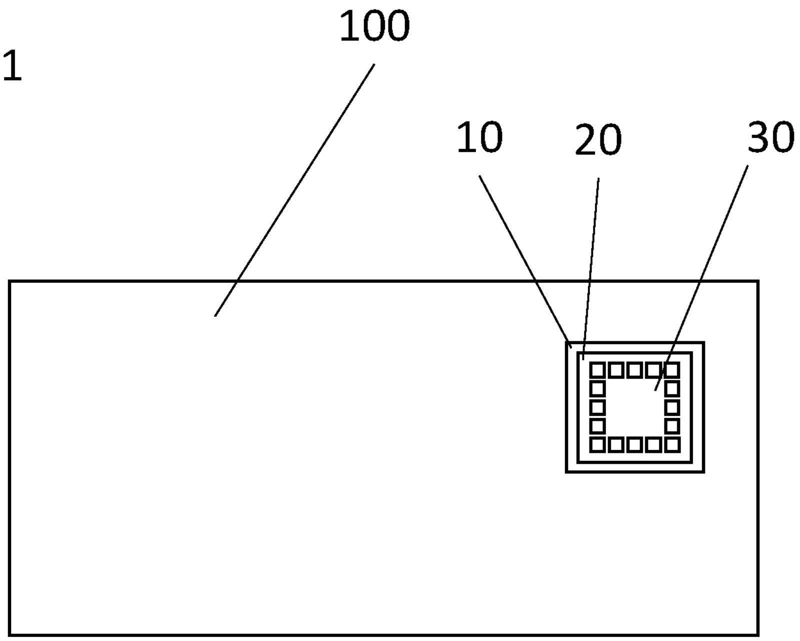
FIG. 1 shows a value document 100 having a security element 10.

FIG. 1 shows a value document 100 having a security element 10. The security element 10 comprises at least one motif region 20. (At least) one main motif 30 can be visible to an observer in the motif region 20.

The value document 100 can be a banknote, for example. A carrier or substrate of the value document 100 can comprise or consist of one or more paper layers. The carrier or the substrate of the value document 100 can alternatively comprise or consist of one or more plastic layers. Furthermore, the carrier or the substrate of the value document 100 can alternatively comprise at least one paper layer and at least one plastic layer.

The security element 10 can be applied to the carrier (or the substrate) of the value document 100, for example, as a security strip or security spot (patch). In general, the security elements are provided on a transfer carrier, for example a plastic film, and then transferred from the transfer carrier (detached and) to the carrier of the value document. Alternatively, the security element is introduced into the carrier of the value document, for example, as a security thread. The security element can in particular already be introduced into the carrier during the production of the carrier, for example, already during the paper or film production or between two partial layers of the carrier.

Figure 2:
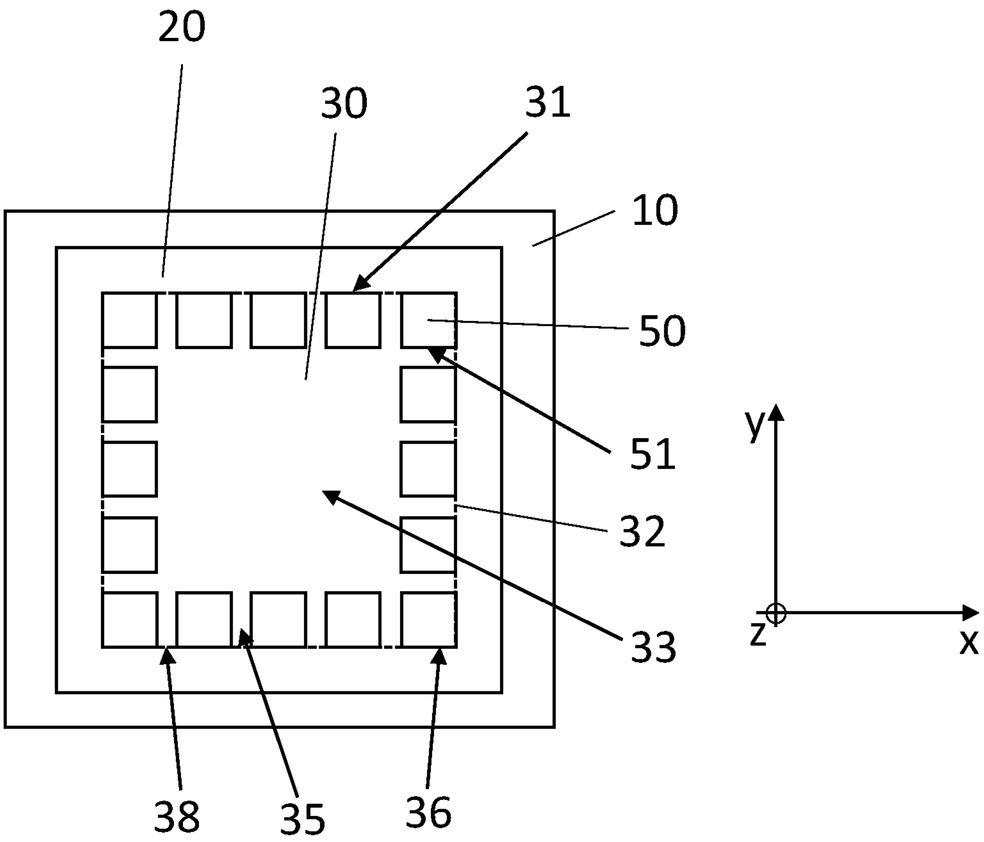
FIG. 2 shows a security element 10 having a main motif 30.

FIG. 2 shows a security element 10 having a motif region 20 at a first observation angle.

An x-y plane can be defined by the security element 10, wherein the x-y plane defines an x axis and a y axis. The x axis and the y axis can be oriented perpendicular to one another. A z axis can be oriented perpendicular to the x-y plane.

A main motif 30 having submotifs 50 is visible to an observer on the security element 10, in particular in the motif region 20. The main motif 30 having the submotifs 50 is visible at a first observation angle as shown in the figure.

In general, sections in the motif region 20 appearing bright to the observer are represented as black in the figures for reasons of illustration and sections in the motif region 20 appearing dark to the observer are represented as white (light).

Brightly or darkly appearing sections in the motif region 20 can be implemented in that micromirrors are arranged in the motif region 20. The surfaces of the micromirrors can be tilted in relation to the x-y plane so that they reflect light from the light source at different strengths to the observer depending on the observation angle.

For example, micromirrors in a first section of the motif region 20 can be tilted so that a relatively high proportion of light is reflected from the light source to the observer at an observation angle. Micromirrors in a second section of the motif region 20 can be tilted so that a relatively small proportion of light, in particular no light, is reflected from the light source to the observer at the observation angle. The first section of the motif region 20 can appear bright or can be brightly perceptible by the observer. The second section of the motif region 20 can appear dark or can be darkly perceptible by the observer.

At a different observation angle, the first section of the motif region 20 can reflect a relatively small proportion of light from the light source to the observer and the second section of the motif region 20 can reflect a relatively high proportion of light from the light source to the observer.

The main motif 30 can have a main motif shape 31. The main motif shape 31 can be a geometrical figure, for example. The submotifs 50 have a submotif shape 51 which corresponds to the main motif shape 31.

The main motif shape 31 can be defined by a contour 32 of the main motif 30. The contour 32 of the main motif 30 can (completely) enclose or surround an area or an inner section 33 of the main motif 30. The submotifs 50 can be visible along the contour 32 of the main motif 30. The contour 32 of the main motif 30 can be formed by the submotifs 50.

In the example of FIG. 2, the main motif shape 31 is a square and the submotif shape 51 is also a square. The submotifs 50 are each smaller than the main motif 30 here. The squares (submotif shapes 51 of the example of FIG. 2) of the submotifs 50 especially have a smaller area than the square (main motif shape 31 of the example of FIG. 2) of the main motif 30.

Similarly, the submotif shapes 51 can each be an apple, for example, and the main motif shape 31 can be an apple. In this case, the apple of the submotif shape 51 can have a smaller area than the apple of the main motif shape 31. Or the submotif shapes 51 can each be a circle, for example, and the main motif shape 31 can be a circle. In this case, the circle of the submotif shape 51 can have a smaller area than the circle of the main motif shape 31.

The contour 32 of the main motif 30 can be perceptible as a continuous line. For example, the contour 32 of the main motif 30 can be a continuously brightly visible section of the main motif.

If the contour 32 of the main motif 30 is perceptible as a continuous line, the submotifs 50 can be arranged so that no gap 35 is visible between the submotifs 50 (in the area of the contour 32).

The contour 32 of the main motif 30 can be perceptible by an observer as an interrupted or non-continuous line. For example, the contour 32 of the main motif 30 can alternately have brightly perceptible sections 36 and darkly perceptible sections 38. A brightly perceptible section 36 can follow a darkly perceptible section 38 here, which is in turn followed by a brightly perceptible section 36, etc.

A brightly perceptible section 36 of the contour 32 of the main motif 30 can be defined by a submotif 50. For example, one submotif 50 or each of the submotifs 50 can comprise a contour 52 (see FIG. 12*b*). A section of the contour 52 of a submotif 50 can be the brightly perceptible section 36 of the contour 32 of the main motif 30.

Brightly perceptible sections 36 of the contour 32 of the main motif 30 can be sections of contours 52 of the submotifs 50.

The submotifs 50 can be visible along the contour 32 of the main motif 30. The contour 32 of the main motif 30 can (completely) surround the submotifs 50.

The submotifs 50 can be (completely) visible in an inner section 33 of the main motif 30. The inner section 33 of the main motif 30 can be (completely) surrounded by the contour 32 of the main motif 30.

The submotifs 50 can be visible spaced apart in the motif region 20. A gap 35 can be present between two adjacent submotifs 50.

The submotifs 50 can be visible constantly spaced apart in the motif region 20. An equal gap 35 can be visible between two adjacent submotifs 50 for all submotifs 50 in the motif region 20.

A gap 35 between two submotifs 50 can cause a darkly perceptible section 38 of the contour 32 of the main motif 30. A darkly perceptible section 38 of the contour 32 of the main motif 30 can be an absence of a contour 52 of a submotifs 50.

Brightly perceptible sections 36 and darkly perceptible sections 38 of the contour 32 of the main motif 30 can have a different length extension.

For example, brightly perceptible sections 36 can have a greater length extension than darkly perceptible sections 38.

Darkly perceptible sections 38 can also have a greater length extension than brightly perceptible sections 36.

Brightly perceptible sections 36 and darkly perceptible sections 38 can have an equal length extension.

At least 10%, preferably at least 25%, more preferably at least 40%, more preferably at least 55%, more preferably at least 70%, more preferably at least 85%, more preferably at least 90% of the darkly perceptible sections 38 of the contour 32 of the main motif 30 can have the same length extension.

At least 10%, preferably at least 25%, more preferably at least 40%, more preferably at least 55%, more preferably at least 70%, more preferably at least 85%, more preferably at least 90% of the brightly perceptible sections 36 of the contour 32 of the main motif 30 can have the same length extension.

The contour 32 of the main motif 30 can be brightly perceptible on at least 10%, preferably on at least 25%, more preferably on at least 40%, more preferably on at least 55%, more preferably on at least 70%, more preferably on at least 85%, more preferably on at least 90% (of its total length).

The contour 32 of the main motif 30 can be darkly perceptible on at least 10%, preferably on at least 25%, more preferably on at least 40%, more preferably on at least 55%, more preferably on at least 70%, more preferably on at least 85%, more preferably on at least 90% (of its total length).

The inner section 33 of the main motif 30 surrounded by the contour 32 can be darkly perceptible on at least 25%, preferably on at least 50%, more preferably on at least 60%, more preferably on at least 70%, more preferably on at least 80%, more preferably on at least 90%.

Figure 3:
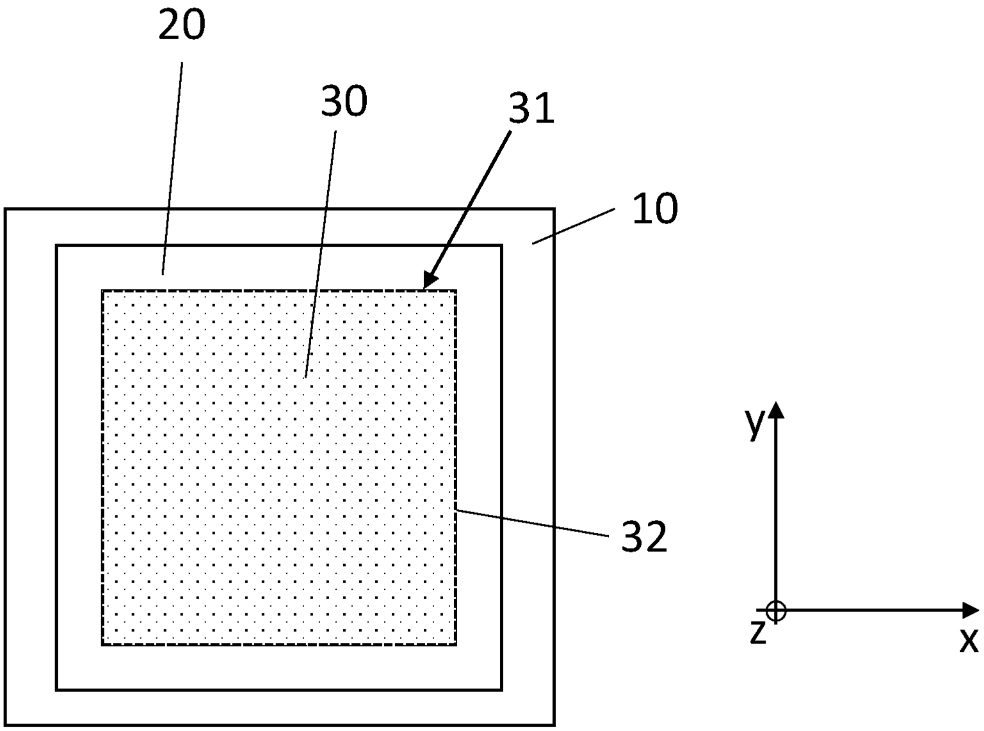
FIG. 3 shows a security element 10 having highlighted main motif 30.

FIG. 3 shows a security element 10 having a motif region 20. The main motif 30 is indicated therein as a dotted area. The main motif 30 having its main motif shape 31 can be delimited by the contour 32 over the entire area in relation to the surroundings of the main motif 30. In particular, the main motif 30 comprises a continuous area which is enclosed by the contour 32 of the main motif 30.

Figure 4:
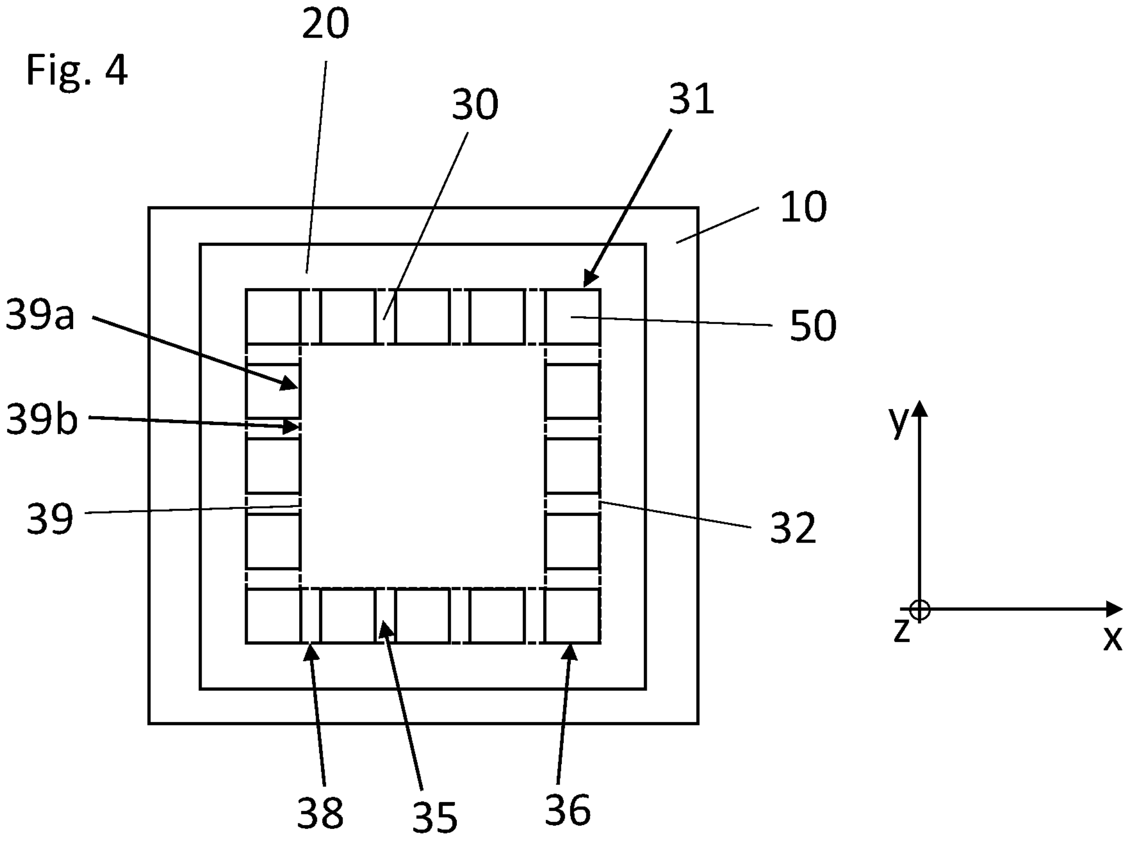
FIG. 4 shows a security element 10 having a main motif 30.

FIG. 4 shows a security element 10 having a motif region 20 at a first observation angle. The security element 10 can be identical to the security element 10 described in consideration of FIG. 1.

The main motif 30 having its main motif shape 31 is visible (perceptible) in the motif region 20. The main motif 30 can have a contour 31 as the outer contour. The main motif 30 can have an inner contour 39.

The main motif 30 comprises the submotifs 50. The submotifs 50 can be visible between the inner contour 39 and the outer contour. The submotifs 50 can be visible along the inner contour 39. The submotifs 50 can be visible along the outer contour. There can be a gap 35 between two adjacent submotifs 50. The arrangement of the submotifs 50 can be identical to the arrangement of the submotifs 50 as described in consideration of FIG. 1. Also as described for FIG. 1, the contour 32 as the outer contour can comprise brightly perceptible sections 36 and darkly perceptible sections 38.

The inner contour 39 of the main motif 30 can be perceptible as a continuous line. For example, the inner contour 39 of the main motif 30 can be a continuously brightly visible section of the main motif 30.

If the inner contour 39 of the main motif 30 is perceptible as a continuous line, the submotifs 50 can be arranged so that no gap is visible between the submotifs 50 (in the region of the inner contour 39).

The inner contour 39 can comprise brightly perceptible sections 39*a*. The inner contour can comprise darkly perceptible sections 39*b*.

The inner contour 39 of the main motif 30 can be perceptible by an observer as interrupted or noncontinuous line. For example, the inner contour 39 of the main motif 30 can alternately have brightly perceptible sections 39*a* and darkly perceptible sections 39*b*. In this case, a brightly perceptible section 39*a* can follow a darkly perceptible section 39*b*, which is in turn followed by a brightly perceptible section 39*a*, etc.

A brightly perceptible section 39*a* of the inner contour 39 of the main motif 30 can be defined by a submotif 50. For example, one submotif 50 or each of the submotifs 50 can comprise a contour 52 (see FIG. 13*b*). A section of the contour 52 of a submotif 50 can be the brightly perceptible section 39*a* of the inner contour 39 of the main motif 30.

Brightly perceptible sections 39*a* of the inner contour 39 of the main motif 30 can be sections of contours 52 of the submotifs 50.

The submotifs 50 can be visible along the inner contour 39 of the main motif 30.

Brightly perceptible sections 39*a* and darkly perceptible sections 39*b* of the inner contour 39 of the main motif 30 can have a different length extension.

For example, brightly perceptible sections 39*a* can have a greater length extension than darkly perceptible sections 39*b*.

Darkly perceptible sections 39*b* can also have a greater length extension than brightly perceptible sections 39*a*.

Brightly perceptible sections 39*a* and darkly perceptible sections 39*b* can have an equal length extension.

At least 10%, preferably at least 25%, more preferably at least 40%, more preferably at least 55%, more preferably at least 70%, more preferably at least 85%, more preferably at least 90% of the darkly perceptible sections 39*b* of the inner contour 39 of the main motif 30 can have the same length extension.

At least 10%, preferably at least 25%, more preferably at least 40%, more preferably at least 55%, more preferably at least 70%, more preferably at least 85%, more preferably at least 90% of the brightly perceptible sections 39*a* of the inner contour 39 of the main motif 30 can have the same length extension.

The inner contour 39 of the main motif 30 can be brightly perceptible on at least 10%, preferably on at least 25%, more preferably on at least 40%, more preferably on at least 55%, more preferably on at least 70%, more preferably on at least 85%, more preferably on at least 90% (of its total length).

The inner contour 39 of the main motif 30 can be darkly perceptible on at least 10%, preferably on at least 25%, more preferably on at least 40%, more preferably on at least 55%, more preferably on at least 70%, more preferably on at least 85%, more preferably on at least 90% (of its total length).

Figure 5:
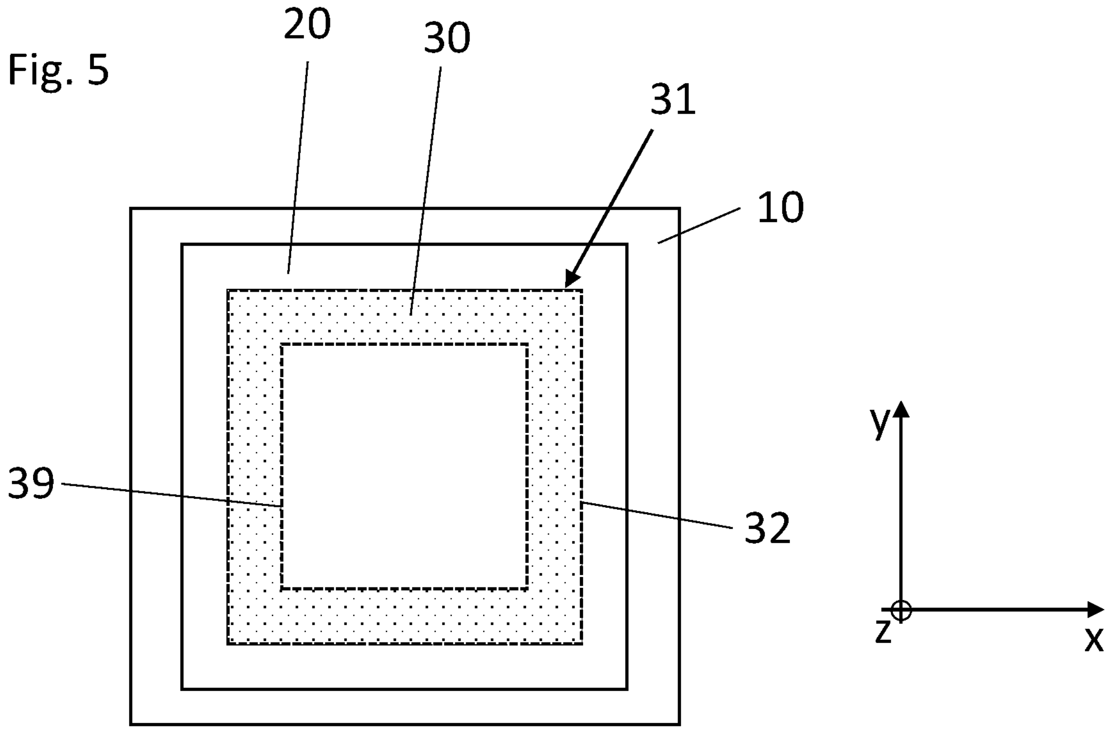
FIG. 5 shows a security element 10 having highlighted main motif 30.

The main motif 30 can extend between the contour 32 as the outer contour and the inner contour 39. This is indicated in FIG. 5 by a dotted area. The area between the inner and outer contour can be designated as the main motif area.

The main motif 30 can have a frame-like shape.

Figure 6:
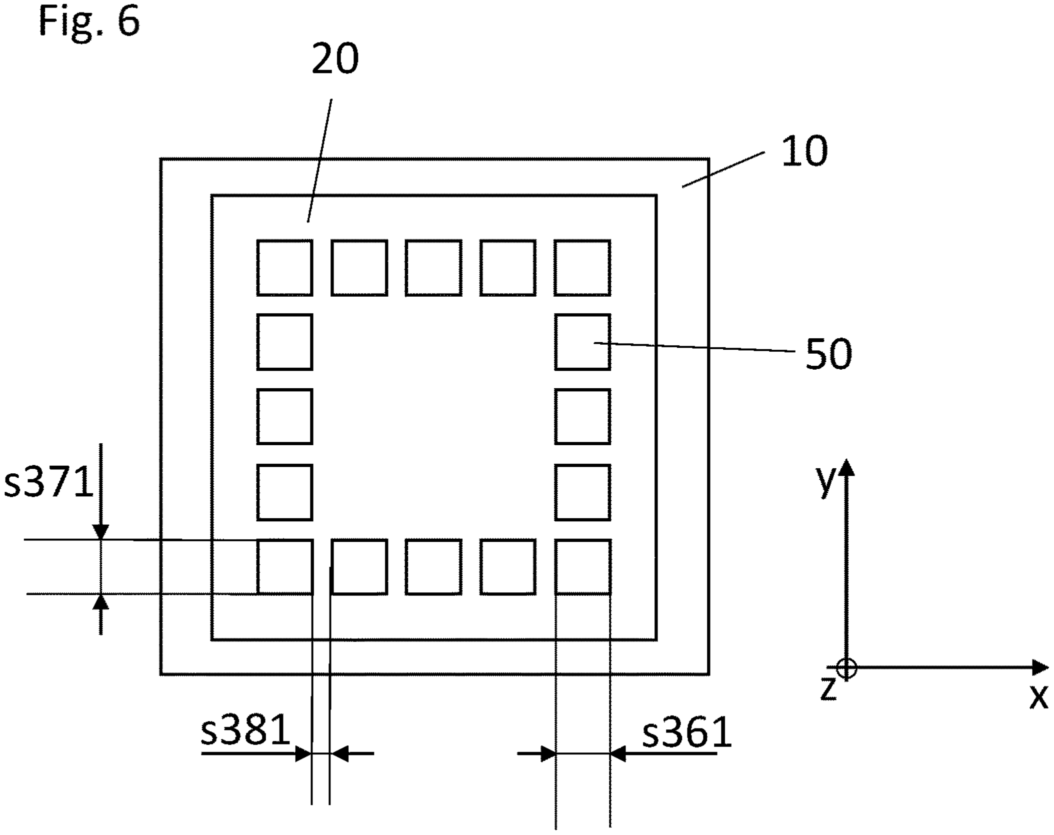
FIG. 6 shows a security element 10 having submotifs 50 and dimensions s361, s371, and s381.

FIG. 6 shows a security element 10 at a first observation angle. The security element 10 comprises a motif region 20, in which submotifs 50 are visible. The security element 10 can be any security element 10 disclosed herein.

A submotif 50 can have a width s361. The width can be visible in the x direction (in the direction of the x axis). The width can be the maximum visible extension of the submotif 50 in the x direction. The submotif 50 can have a height s371. The height can be visible in the y direction (in the direction of the y axis). The height can be the maximum visible extension of the submotif 50 in the y direction.

The width s361 and the height s371 can be equal, as shown in the figure. The width s361 and the height s371 can have the same longitudinal extension. The submotif shape (and the main motif shape) is, for example, the square, a regular n-polygon, or a circle.

The width s361 and the height s371 can also be different. The width s361 and the height s371 can have a different longitudinal extension. The width s361 can be greater or less than the height s371. The width s361 can have a greater or lesser longitudinal extension than the height s371. The submotif shape (and the main motif shape) is then, for example, a rectangle, an irregular n-polygon, or an oval.

The contour 32 can comprise a brightly perceptible section 36, the longitudinal extension of which is equal to the (longitudinal extension of the) width s361 and/or the (longitudinal extension of the) height s371.

There can be a spacing s381 between two adjacent submotifs 50. There can be a spacing s381 between each of the submotifs 50. The spacing s381 between two adjacent submotifs 50 can be less than, preferably at most half of, the width s361 and/or the height s371 of a submotif 50. The distance s381 between two adjacent submotifs 50 can also, however, be greater than the width s361 and/or the height s371 of a submotif 50. The spacing s381 between two adjacent submotifs 50 can also be equal to the width s361 and/or the height s371 of a submotif 50.

A component or all of the submotifs 50 of the main motif 30 can have the described height s371 and/or width s361.

Figure 7:
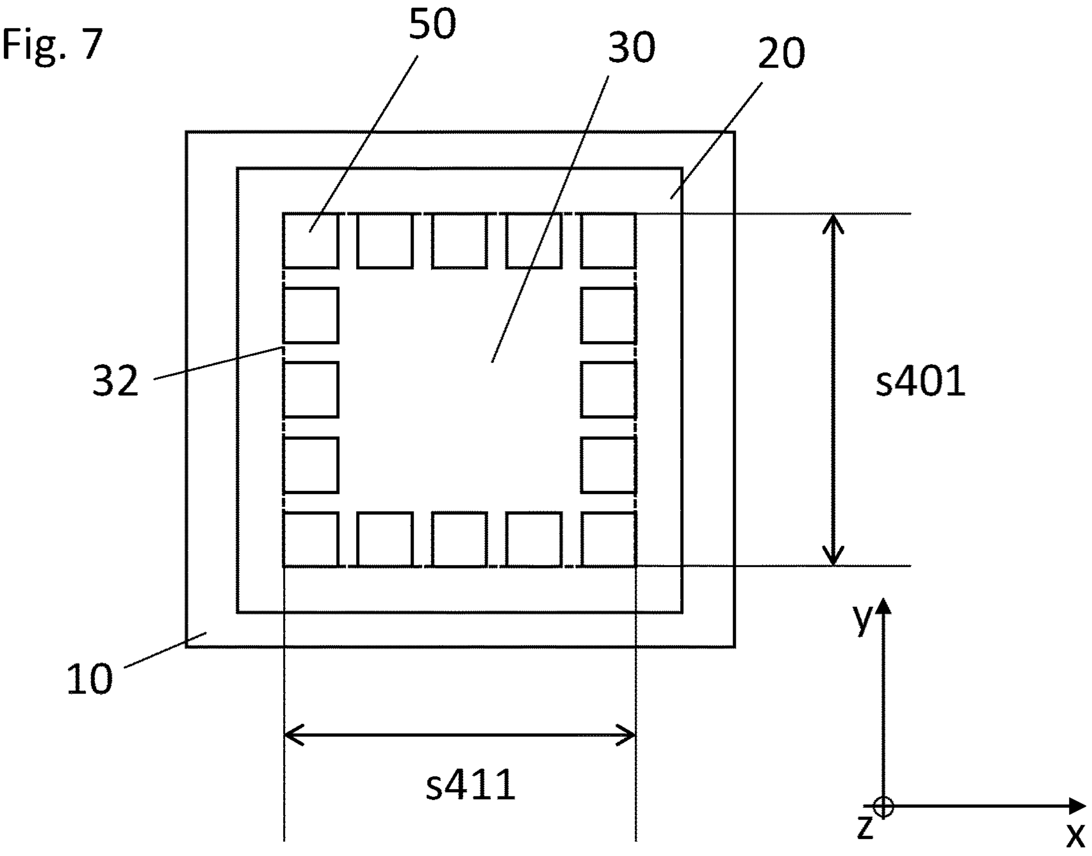
FIG. 7 shows a security element 10 having submotifs 50 and dimensions s401 and s411.

FIG. 7 shows a security element 10 at a first observation angle. The security element 10 can be any security element 10 disclosed herein.

The main motif 30 can have a width s411. The width can be visible in the x direction (in the direction of the x axis). The width can be the maximum visible extension of the main motif 30 in the x direction. The main motif 30 can be delimited in the x direction by the contour 32 of the main motif 30.

The main motif 30 can have a height s401. The height can be visible in the y direction (in the direction of the y axis). The height can be the maximum visible extension of the main motif 30 in the y direction. The main motif 30 can be delimited in the y direction by the contour 32 of the main motif 30. The width s411 and the height s401 can be equal. The width s411 and the height s371 can have the same longitudinal extension. The width s411 and the height s401 can be different. The width s411 and the height s401 can have a different longitudinal extension. The width s411 can be greater than the height s401. The width s411 can have a greater longitudinal extension than the height s401. The width s411 can be less than the height s401. The width s411 can have a lesser longitudinal extension than the height s401.

A ratio between the width s411 and the height s401 of the main motif 30 can be essentially equal (±10%) to a ratio between the width s361 and the height s371 of the submotif or the submotifs 50.

Figure 8A:
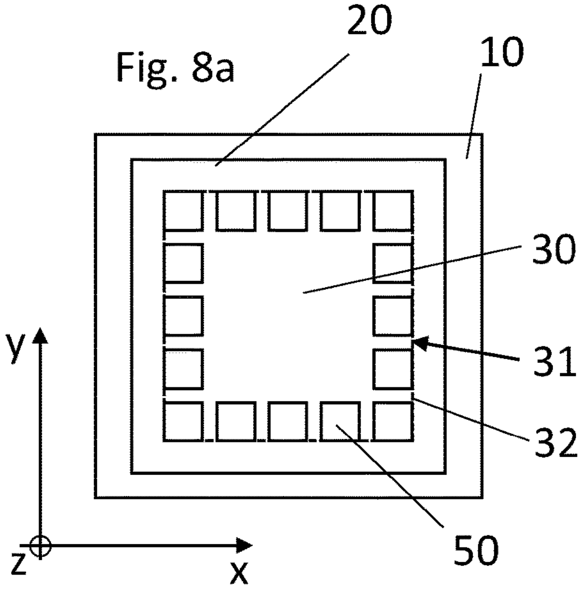
FIG. 8*a* shows a security element 10 at a first observation angle.
Figure 8B:
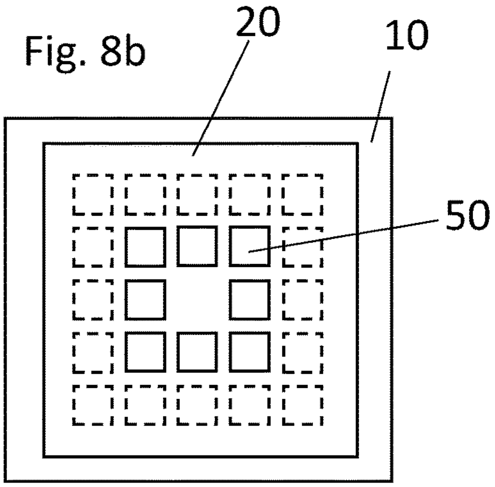
FIG. 8*b* shows the security element 10 in a transition from the first observation angle to a second observation angle.
Figure 8C:
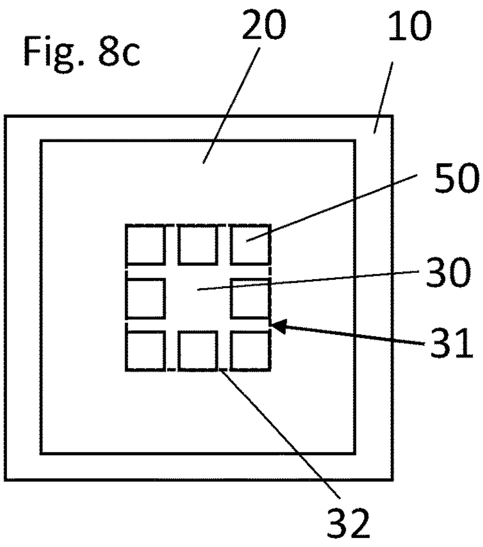
FIG. 8*c* shows the security element 10 at the second observation angle.
Figure 8D:
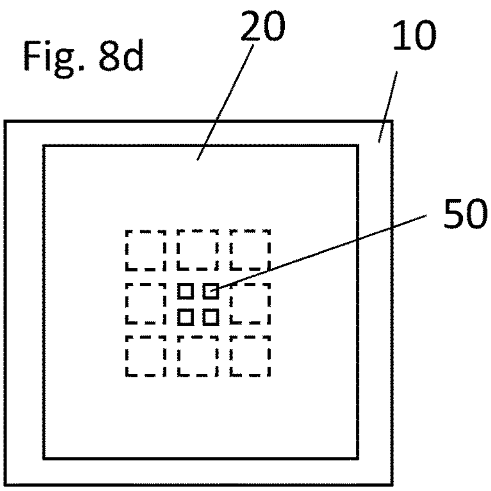
FIG. 8*d* shows the security element 10 in a transition from the second observation angle to a further second observation angle.
Figure 8E:
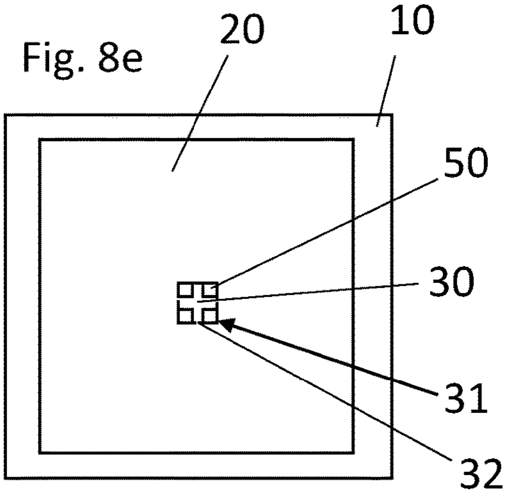
FIG. 8*e* shows the security element 10 at the further second observation angle.

FIGS. 8*a*, 8*c*, and 8*e* show a security element 10 at various observation angles. The security element 10 is tilted along a first axis, which lies in the x-y plane, in particular along the x axis, in order to achieve the different observation angles. The security element 10 can be any security element 10 disclosed herein.

The security element 10 comprises a motif region 20, in which a main motif 30 having a main motif shape 31 is visible by an observer. The main motif 30 can comprise a contour 32. The main motif 30 is represented by the submotifs 50.

FIG. 8*a* shows the security element 10 at the first observation angle. In this example, the main motif shape 31 is a square. The main motif 30 can be delimited in relation to the surroundings of the main motif 30 by its contour 32. The main motif 30 comprises the submotifs 50, which are visible along the contour 32.

FIG. 8*b* shows the same security element 10 as in FIG. 8*a*. A transition from the first observation angle to a second observation angle is indicated in FIG. 8*b*. The security element 10 at the second observation angle is shown in FIG. 8*c*. At least the position of the submotifs 50 has changed at the second observation angle.

A transition from the first observation angle to a second observation angle can take place by tilting the security element 10 or a value document 100 having the security element 10 around the x axis (north-south tilting). The positions of the light source and of the observer do not change.

For example, the submotifs 50 are arranged at the second observation angle so that the main motif 30 has become smaller. In particular, the submotifs 50 can be visible in a section of the motif region 20 which is surrounded by the contour 32 of the main motif at the first observation angle. This is indicated in FIG. 8*b* by submotifs 50 having dashed contour. The submotifs 50 having dashed contour show the submotifs 50 at the first observation angle and the submotifs 50 having continuous contour show the submotifs at the second observation angle. The inner contour of the main motif at the first observation angle surrounds the contour 32 of the main motif at the second observation angle. It can also be established that the submotifs 50 of the two observation angles do not overlap.

The number of the submotifs 50 can have changed in the second observation angle. In FIG. 8*b*, for example, from five to three submotifs per direction. The number of visible submotifs 50 can thus be less (or greater) at the second observation angle than at the first observation angle, in particular if the main motif 30 has become smaller (or larger). Alternatively or additionally, the size of the submotifs 50 can change, submotifs 50 of equal size are shown in FIG. 8*b*.

FIG. 8*c* shows the main motif 30 at the second observation angle. The area of the main motif 30 can be less at the second observation angle than at the first observation angle. The area of the main motif 30 surrounded by the contour 32 can be less at the second observation angle than at the first observation angle.

The main motif shape 31 of the main motif 30 at the second observation angle can correspond to the main motif shape 31 of the main motif 30 at the first observation angle. In this example, the main motif shape 31 of the main motif 30 is a square in each case at both the first observation angle and also the second observation angle. The squares have a different area here. Due to an enlargement of the main motif 30 at the second observation angle, it may be brought into congruence with the main motif 30 at the first observation angle.

FIG. 8*d* shows a transition of the main motif 30 from the second observation angle to a further second observation angle. Similarly, to the illustration in FIG. 8*b*, submotifs 50 having a dashed contour indicate submotifs 50 at the second observation angle and submotifs 50 having continuous contour indicate submotifs 50 at the further second observation angle.

A transition from the second observation angle to the further second observation angle will take place due to a further tilt of the security element 10 or of a value document 100 having the security element 10 around the x axis (north-south tilt). A position of the light source and of the observer has not changed here.

At the further second observation angle, the position of the submotifs 50 has changed further. For example, the submotifs 50 can be visible in a section of the motif region 20, which is surrounded by the contour 32 of the main motif 30 at the second observation angle. The main motif 30 has continued to become smaller upon further tilting.

At the further second observation angle, the number of the submotifs 50 can have changed. For example, the number of visible submotifs 50 at the further second observation angle can be less (or greater) than at the further observation angle, in particular if the main motif 30 has become smaller (or larger). Alternatively or additionally, the size of the submotifs 50 can change, thus, for example, become smaller at the same time as shown.

In FIG. 8*e*, the main motif 30 is visible at the further second observation angle. The area of the main motif 30 can, as shown, be less at the further second observation angle than at the second observation angle. The area of the main motif 30 surrounded by the contour 32 can, as shown, be less at the further second observation angle than at the second observation angle.

The main motif shape 31 of the main motif 30 at the further second observation angle can correspond to the main motif shape 31 of the main motif 30 at the second observation angle. In this example, the main motif shape 31 of the main motif 30 is a square in each case both at the second observation angle and also at the further second observation angle. The squares have a different area here. Due to an enlargement of the main motif 30 at the further second observation angle, it may be brought into congruence with the main motif 30 at the second (and the first) observation angle.

A security element 10 is shown in FIGS. 8*a* to 8*e* which has two second observation angles. More than two, in particular three or four, second observation angles can also be present.

A movement of the main motif 30, in FIGS. 8*a* to 8*e* thus the size change of the main motif 30, can appear continuously to the observer during the tilting. The submotifs 50 can either be statically arranged or can move during the tilting of the security element.

A movement which appears continuously (in particular continuous size change) of the main motif can be achieved by means of statically arranged submotifs 50. In particular, the submotifs 50 of the following (second or further second) observation angle can increasingly become visible in sections during the tilting while the submotifs 50 of the previous observation angle accordingly become invisible in sections in the opposite direction. The main motif—as in FIGS. 8*a*, 8*c*, and 8*e*—is initially represented by the completely visible or lighted submotifs of a (first or second) observation angle and then represented by the completely visible or lighted submotifs of the following (second or further second) observation angle. In the transition between the mentioned observation angles—beginning on the side of the submotifs of the first (or second) observation angle—more and more partial sections of the submotifs of the second (or further second) observation angle become visible (bright). Similarly—beginning on the averted side of the submotifs of the second (or further second) observation angle—more and more partial sections of the submotifs of the first (or second)

observation angle become invisible (dark). The main motif is thus represented as moving by the static submotifs only visible in partial sections between the first and second observation angles.

Alternatively, a movement appearing continuously (in particular continuous size change) of the main motif can also be achieved by means of moving submotifs. The main motif moves during tilting of the security element in that at least several of the submotifs move, in particular move from a position of the submotif at the first (or second) observation angle to a position of the submotif at the second (or further second) observation angle. Proceeding from FIG. 8*a*, eight of the sixteen visible submotifs 50, thus, for example, every other one of the submotifs 50, move inward until they have reached their new position of FIG. 8*c*. The other eight submotifs disappear (become dark), preferably with the beginning of the movement. Starting from FIG. 8*c*, four of the eight submotifs 50, thus, for example, again every other submotif, move inward until they have reached their new position of FIG. 8*e*. The other four submotifs disappear, preferably with the beginning of the further movement.

Moving submotifs are advantageous for a continuous movement of the main motif, since they are more difficult to simulate. In contrast, the use of static submotifs assists a brighter representation of the motifs and/or a second effect for another tilt axis.

It is conceivable, but does not result in a continuous movement of the main motif, if the brightness of the submotifs changes as a whole in each case during the tilting to the (further) second observation angle. If the submotifs were to change their overall brightness from a limiting angle during the tilting, for example (bright=>dark, dark=>bright), an abrupt position change of the main motif would be visible to the observer. In contrast, if the submotifs change their overall brightness continuously during the tilting, in particular the submotifs of the first (or second) observation angle continuously from bright to dark and the submotifs of the second (or further second) observation angle continuously from dark to bright, a main motif would be visible to the observer which is slowly shown at its new position and is slowly hidden at its old position.

Figure 9A:
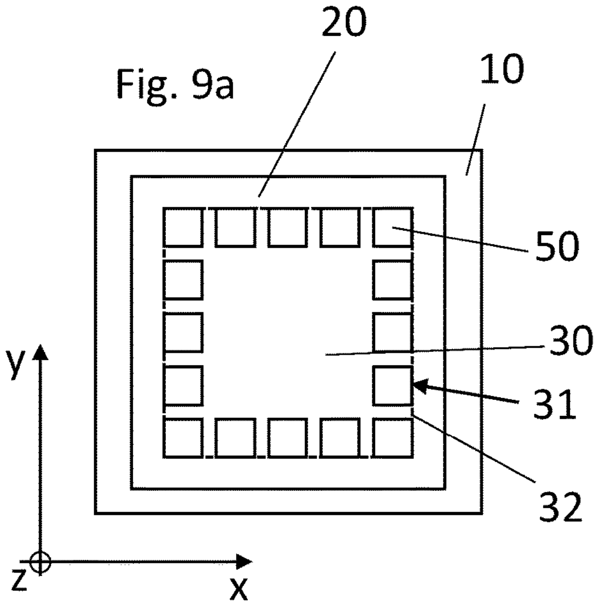
FIG. 9*a* shows a security element 10 at a first observation angle.
Figure 9B:
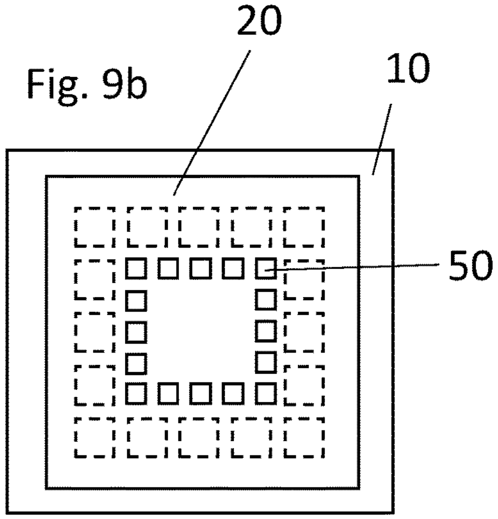
FIG. 9*b* shows the security element 10 in a transition from the first observation angle to a second observation angle.
Figure 9C:
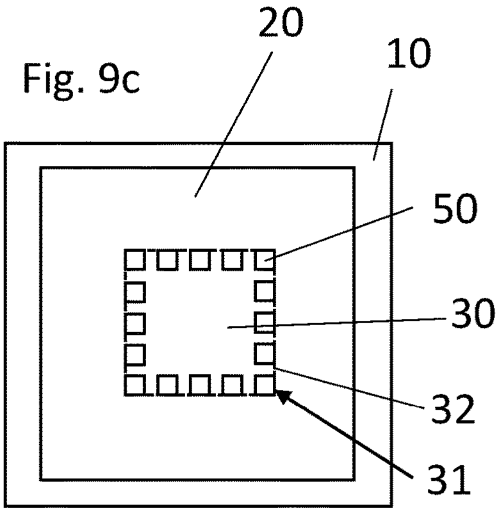
FIG. 9*c* shows the security element 10 at the second observation angle.
Figure 9D:
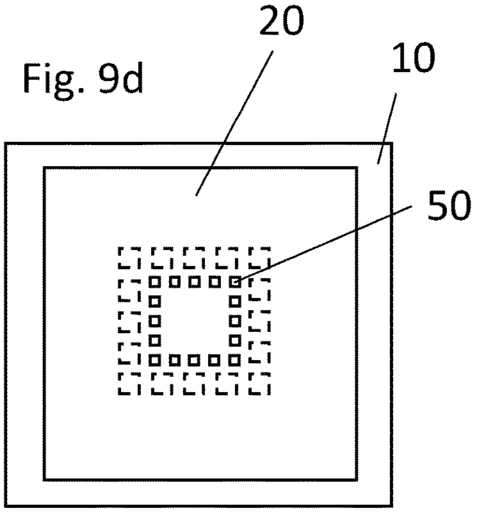
FIG. 9*d* shows the security element 10 in a transition from the second observation angle to a further second observation angle.
Figure 9E:
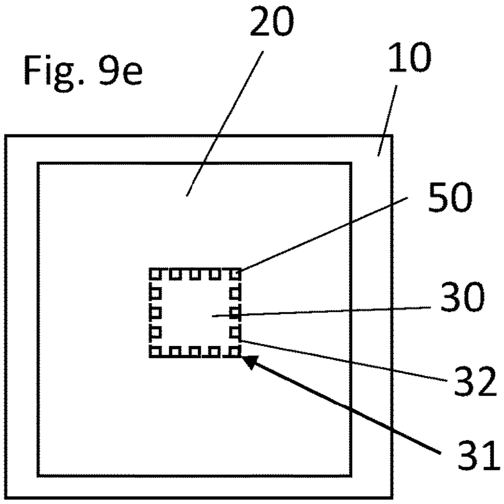
FIG. 9*e* shows the security element 10 at the further second observation angle.

FIGS. 9*a*, 9*c*, and 9*e* show a security element 10 at various observation angles, in particular a first, a second, and a further second observation angle, respectively. The security element 10 can be any security element 10 disclosed herein.

The security element 10 comprises a motif region 20, in which a main motif 30 having its main motif shape 31 is visible to an observer. The main motif 30 can comprise a contour 32. The main motif 30 comprises the submotifs 50, and is represented in particular with the aid of the submotifs 50.

FIG. 9*a* shows the security element 10 at the first observation angle. In this example, the main motif shape 31 is a square. The main motif 30 is delimited in relation to the surroundings of the main motif 30 by a contour 32. The main motif 30 comprises the submotifs 50. The submotifs 50 can be visible along the contour 32.

The security element 10 can define an x-y plane having an x axis (x direction) and a y axis (y direction). Tilting of the security element 10 takes place. A transition from the first observation angle to a second or further second observation angle can take place as described in consideration of FIGS. 8*a* to 8*e*. In particular, the security element is tilted along an axis in the plane, the x axis here.

FIG. 9*b* shows the same security element 10 as in FIG. 9*a*. A transition from the first observation angle to a second observation angle is indicated in FIG. 9*b*. The security element 10 at the second observation angle is shown in FIG. 9*c*.

At the second observation angle, the position of the submotifs 50 has changed. For example, the submotifs 50 can be visible in a section of the motif region 20, which is surrounded by the contour 32 of the main motif at the first observation angle. This is indicated in FIG. 9*b* by submotifs 50 having dashed contour. The submotifs 50 having dashed contour show the submotifs 50 at the first observation angle and the submotifs 50 having continuous contour show the submotifs 50 at the further observation angle. The submotifs 50 of the two observation angles do not overlap one another. The (outer) contour 32 of the main motif at the second observation angle is within the inner contour of the main motif at the first observation angle in the example of FIG. 9*b*.

At the second observation angle, as shown in FIG. 9*b*, the number of the submotifs 50 can remain equal. For example, the number of visible submotifs 50 at the second observation angle can be equal to the number of the submotifs 50 at the first observation angle.

Alternatively or additionally, the size or area of the submotifs 50 can change at the second observation angle. For example, the size or area of visible submotifs 50 at the further observation angle can be less than the size or area of the visible submotifs 50 at the first observation angle.

In FIG. 9*c*, the main motif 30 is visible at the further observation angle. The area of the main motif 30 can be less at the further observation angle than at the first observation angle. The area of the main motif 30 surrounded by the contour 32 can be less at the further observation angle than at the first observation angle.

The main motif shape 31 of the main motif 30 at the second observation angle can correspond to the main motif shape 31 of the main motif 30 at the first observation angle.

Both at the first observation angle and also at the second observation angle, the main motif shape 31 of the main motif 30 can in each case be a square, another geometric shape, or an object shape, such as a pear. The squares each have a different area here. Due to an enlargement of the main motif 30 at the further observation angle, this may be brought into congruence with the main motif 30 at the first observation angle.

FIG. 9*d* shows a transition of the main motif 30 from the second observation angle to a further second observation angle. Similarly, to the illustration in FIGS. 9*b* and 9*c*, submotifs 50 having a dashed contour indicate submotifs 50 at the further observation angle and submotifs 50 having continuous contour indicate submotifs 50 at the further second observation angle.

A transition from the second observation angle to the further second observation angle will take place due to a further tilt of the security element 10 or a value document 100 having the security element 10 around the same axis, thus around the x axis here (north-south tilt).

In the further second observation angle, the position of the submotifs 50 will have changed further. For example, the submotifs 50 can become visible in a section of the motif region 20 which is surrounded by the contour 32 of the main motif at the second observation angle. FIG. 9*d* shows that the submotifs 50 of the further second observation angle have become visible in a section of the motif region 20 which is surrounded by the inner contour 32 of the main motif at the second observation angle.

The number of the submotifs 50 can remain equal in the further second observation angle. For example, the number of visible submotifs 50 can be equal at the still further observation angle to the number of submotifs 50 at the further observation angle.

The size or area of the submotifs 50 can change at the further second observation angle. For example, the size or area of visible submotifs 50 at the still further observation angle can be less than the size or area of the visible submotifs 50 at the further observation angle.

In FIG. 9*e*, the main motif 30 is visible at the further second observation angle. The area of the main motif 30 can be less at the still further observation angle than at the further observation angle. The area of the main motif 30 surrounded by the contour 32 can be less at the still further observation angle than at the further observation angle.

The main motif shape 31 of the main motif 30 at the still further observation angle can correspond to the main motif shape 31 of the main motif 30 at the further observation angle.

The movement is preferably a shrinking or an enlargement of the main motif. A movement of the main motif 30 can, as explained above, appear continuously to the observer between the various observation angles. The submotifs 50 can also again either be statically arranged or can move. A course or a position change of a submotif 50 or each of the submotifs 50 between various observation angles can appear continuously to the observer.

Figure 10:
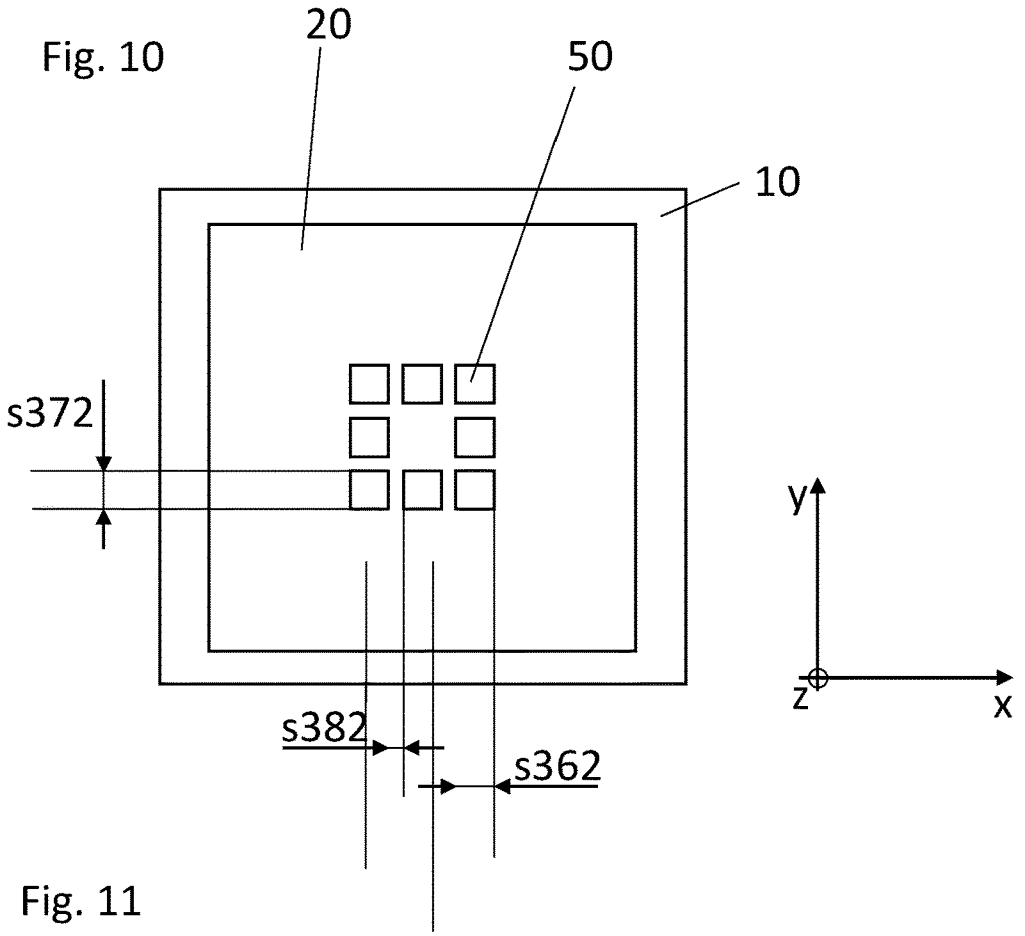
FIG. 10 shows a security element 10 having dimensions s362, s372, and s382.
Figure 11:
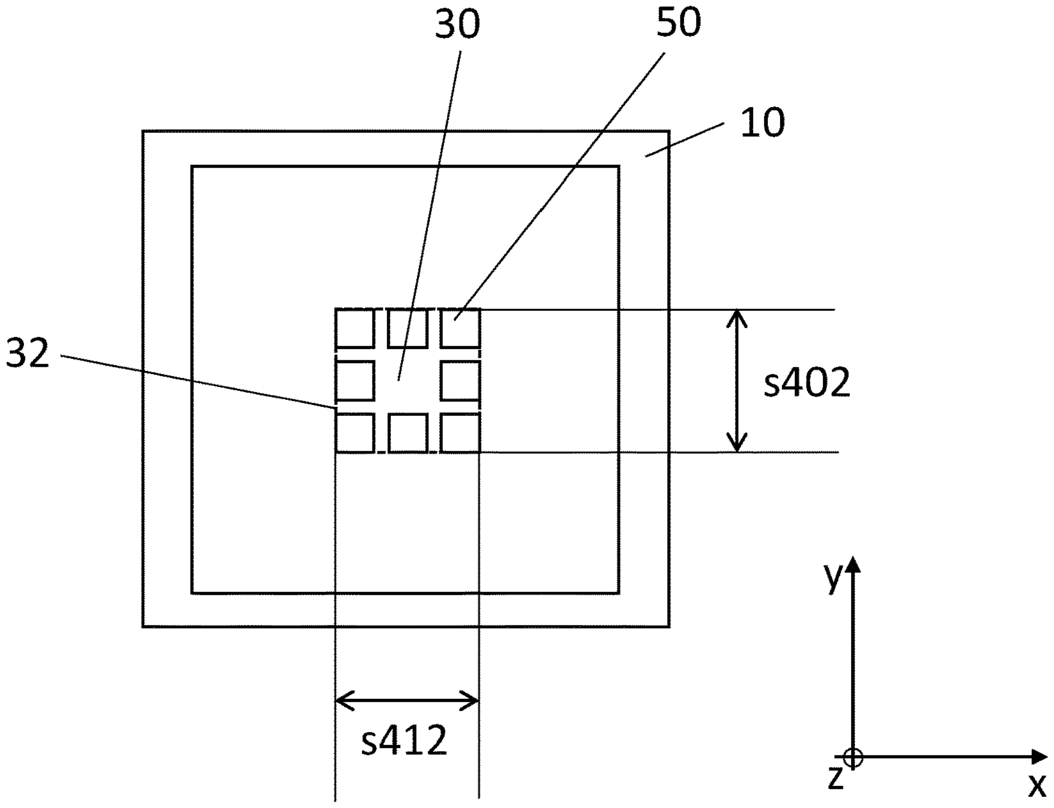
FIG. 11 shows a security element 10 having dimensions s402 and s412.

FIGS. 10 and 11 show by way of example a security element 10 at a further observation angle, for example, a second observation angle. The security element 10 can be any security element 10 disclosed herein. The further observation angle can be different from the first observation angle.

The security element 10 has a motif region 20 having a main motif 30 and submotifs 50.

A submotif 50 at the further observation angle can have a width s362. The width s362 can be visible in the x direction (in the direction of the x axis). The width s362 can be the maximum visible extension of the submotif 50 in the x direction.

The submotif 50 at the further observation angle can have a height s372. The height s372 can be visible in the y direction (in the direction of the y axis). The height s372 can be the maximum visible extension of the submotif 50 in the y direction.

The width s362 of a submotif 50 at the further observation angle can be equal to the width s361 of the submotif 50 at the first observation angle.

The width s362 of a submotif 50 at the further observation angle can be less than the width s361 of the submotif 50 at the first observation angle.

The width s362 of a submotif 50 at the further observation angle can be greater than the width s361 of the submotif 50 at the first observation angle.

The height s372 of a submotif 50 at the further observation angle can be equal to the height s371 of the submotif 50 at the first observation angle.

The height s372 of a submotif 50 at the further observation angle can be less than the height s371 of the submotif 50 at the first observation angle.

The height s372 of a submotif 50 at the further observation angle can be greater than the height s371 of the submotif 50 at the first observation angle.

There can be a spacing s382 between two adjacent submotifs 50. The spacing s381 can be between each of the submotifs 50.

The spacing s381 between two adjacent submotifs 50 at the further observation angle can be equal to the spacing s381 between two adjacent submotifs 50 at the first observation angle.

The spacing s382 between two adjacent submotifs 50 at the further observation angle can be less than the spacing s381 between two adjacent submotifs 50 at the first observation angle.

The spacing s382 between two adjacent submotifs 50 at the further observation angle can be greater than the spacing s382 between two adjacent submotifs 50 at the first observation angle.

The main motif 30 can have a width s412 at the further observation angle. The width can be visible in the x direction (in the direction of the x axis). The width can be the maximum visible extension of the main motif 30 in the x direction. The main motif 30 can be delimited in the x direction by the contour 32 of the main motif 30.

The main motif 30 can have a height s402 at the further observation angle. The height can be visible in the y direction (in the direction of the y axis). The height can be the maximum visible extension of the main motif 30 in the y direction. The main motif 30 can be delimited in the y direction by the contour 32 of the main motif 30.

The width s412 can be less at the further observation angle than the width s411 at the first observation angle.

The height s402 can be less at the further observation angle than the height s401 at the first observation angle.

A ratio between the width s412 and the height s402 at the further observation angle can be essentially equal (±10%) to a ratio between the width s411 and the height s401 at the first observation angle.

A ratio between the width s362 and the height s372 of a submotif 50 at the further observation angle can be essentially equal (±10%) to a ratio between the width s361 and the height s371 of a submotif 50 at the first observation angle.

Figure 12A:
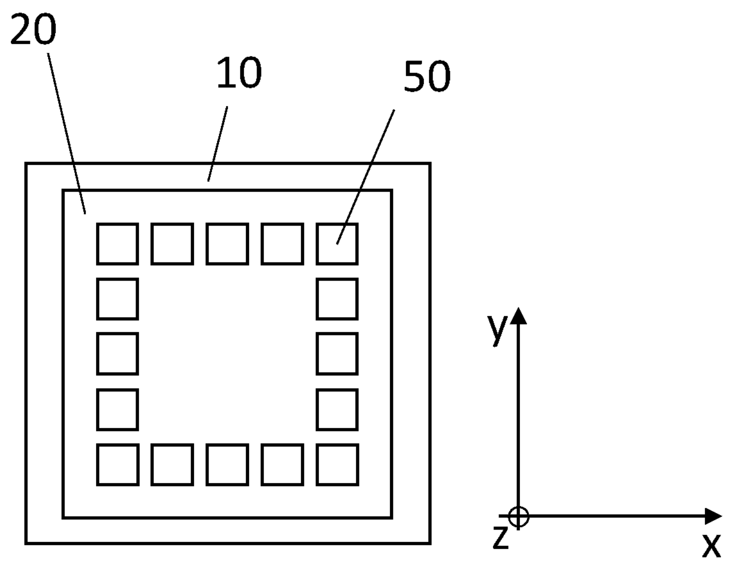
FIG. 12*a* shows a security element 10 having submotifs 50.

FIG. 12*a* shows a security element 10 having a motif region 20 and submotifs 50. The security element 10 can be any security element 10 disclosed herein.

Figure 12B:
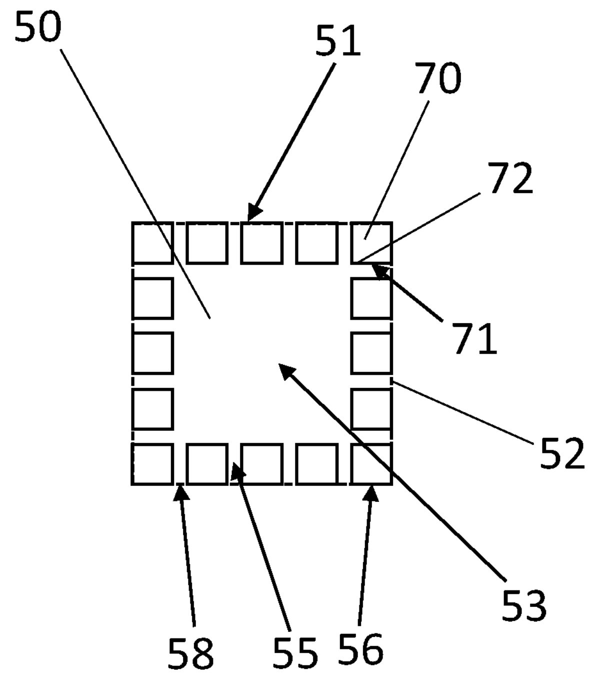
FIG. 12*b* shows an enlarged submotif 50 having sub-submotifs 70.

FIG. 12*b* shows an enlarged submotif 50 of the security element 10 as shown in FIG. 12*a*, for example.

A submotif 50, in particular each of the submotifs 50, can have a submotif shape 51.

A submotif 50, in particular each of the submotifs 50, can have a contour 52. The contour 52 of the submotif 50 can enclose or surround an inner section 53 of the submotif 30.

The submotif shape 51 can be defined by the contour 52 of the submotif 50. The contour 52 of the submotif 50 can (completely) enclose or surround an area.

Sub-submotifs 70 can be visible along the contour 52 of the submotif 50. The contour 52 of the submotif 50 can be formed by the sub-submotifs 70.

The sub-submotifs 70 can have a sub-submotif shape 71. The sub-submotif shape 71 can correspond to the main motif shape 31 and/or the submotif shape 51.

In contrast to main motif and submotif, sub-submotifs are only optionally large enough that they are visible to the observer as a motif. In embodiments, the observer can first recognize a sub-submotif after enlargement, for example with a magnifying glass or a camera, as the motif.

The contour 52 of the submotif 50 can be perceptible as a continuous line. For example, the contour 52 of the submotif 50 can be a continuously brightly visible section of the submotif 50.

The contour 52 of the submotif 50 can be perceptible by an observer as an interrupted or noncontinuous line. For example, the contour 52 of the submotif 50 can have alternately brightly perceptible sections 56 and darkly perceptible sections 58. In this case, a brightly perceptible section 56 can follow a darkly perceptible section 58, which is in turn followed by a brightly perceptible section 56, etc.

A brightly perceptible section 56 of the contour 52 of the submotif 50 can be defined by a sub-submotif 70.

Brightly perceptible sections 56 of the contour 52 of the submotif 50 can be sections of contours 72 of the sub-submotifs 70.

The sub-submotifs 70 can be visible along the contour 52 of the submotif 50. The contour 52 of the submotif 50 can (completely) enclose the sub-submotifs 70.

The sub-submotifs 70 can be (completely) visible in an inner section 53 of the submotif 50. The inner section 53 of the submotif 50 can be (completely) surrounded by the contour 52 of the submotif 50.

The sub-submotifs 70 can be visible spaced apart in the motif region 20. A gap 55 can be present between two adjacent sub-submotifs 50.

The sub-submotifs 70 can be visible constantly spaced apart in the motif region 20. For all sub-submotifs 70 in the motif region 20, an equal gap 55 can be visible between two adjacent sub-submotifs 70.

A gap 55 between two sub-submotifs 70 can cause a darkly perceptible section 58 of the contour 52 of the submotif 50. A darkly perceptible section 58 of the contour 52 of the submotif 50 can be an absence of a contour 72 of a sub-submotif 70.

Brightly perceptible sections 56 and darkly perceptible sections 58 of the contour 52 of the submotif 50 can have a different length extension.

For example, brightly perceptible sections 56 can have a greater length extension than darkly perceptible sections 58.

Darkly perceptible sections 58 can also have a greater length extension than brightly perceptible sections 56.

Brightly perceptible sections 56 and darkly perceptible sections 58 can have an equal length extension.

At least 10%, preferably at least 25%, more preferably at least 40%, more preferably at least 55%, more preferably at least 70%, more preferably at least 85%, more preferably at least 90% of the darkly perceptible sections 58 of the contour 52 of the submotif 50 can have the same length extension.

At least 10%, preferably at least 25%, more preferably at least 40%, more preferably at least 55%, more preferably at least 70%, more preferably at least 85%, more preferably at least 90% of the brightly perceptible sections 56 of the contour 52 of the submotif 50 can have the same length extension.

The contour 52 of the submotif 50 can be brightly perceptible on at least 10%, preferably on at least 25%, more preferably on at least 40%, more preferably on at least 55%, more preferably on at least 70%, more preferably on at least 85%, more preferably on at least 90% (of its total length).

The contour 52 of the submotif 50 can be darkly perceptible on at least 10%, preferably on at least 25%, more preferably on at least 40%, more preferably on at least 55%, more preferably on at least 70%, more preferably on at least 85%, more preferably on at least 90% (of its total length).

The inner section 53 of the submotif 50 surrounded by the contour 52 can be darkly perceptible on at least 25%, preferably on at least 50%, more preferably on at least 60%, more preferably on at least 70%, more preferably on at least 80%, more preferably on at least 90%.

The sub-submotifs 70 can have the same properties as the submotifs 50 and/or the main motif 30.

Figure 13A:
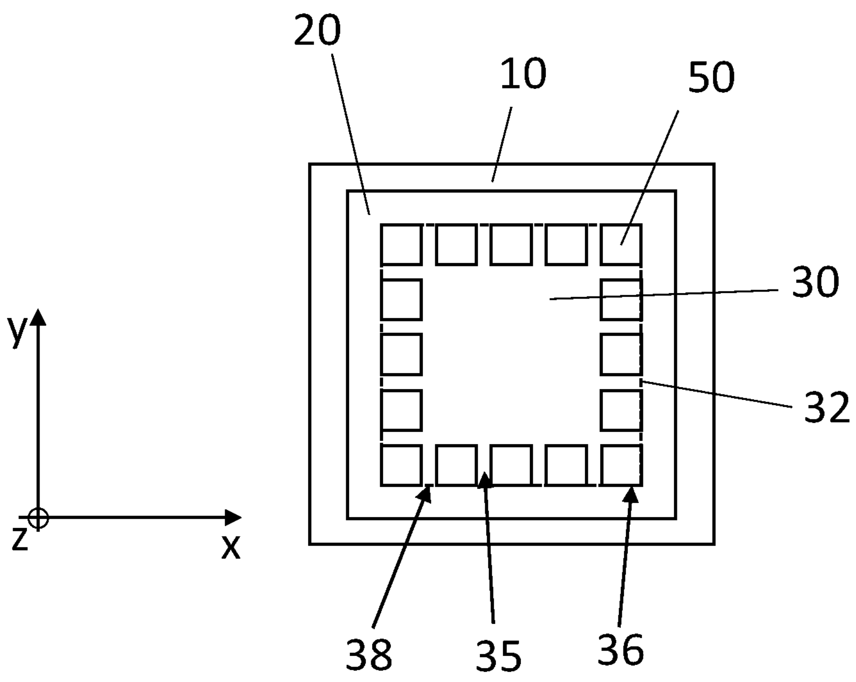
FIG. 13*a* shows a security element 10 having submotifs 50 at an observation angle.
Figure 13B:
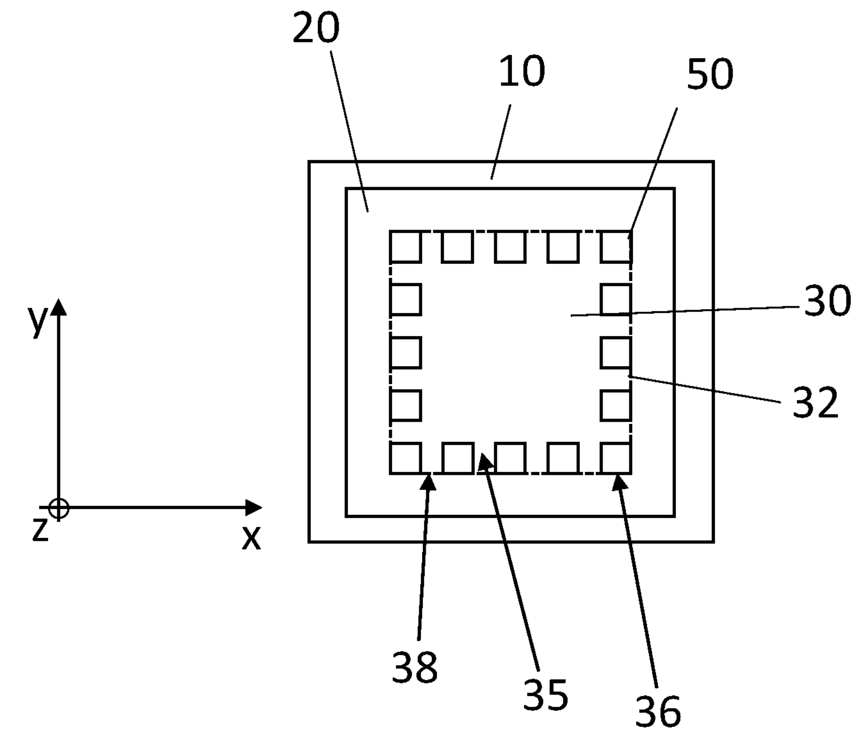
FIG. 13*b* shows the security element 10 having submotifs 50 at a further observation angle.

FIG. 13*a* shows a security element 10 at a third observation angle, which can in particular be any of the first, second, or further second observation angles, and FIG. 13*b* shows the security element 10 at a fourth observation angle. The security element 10 can be any security element 10 disclosed herein.

A transition from the observation angle to the fourth (or further fourth) observation angle can take place due to a tilt of the security element 10 or a value document 100 having the security element 10 around a second axis in the X-Y plane, in particular the y axis (east-west tilt). The position of a light source and the observer do not change.

The position of the submotifs 50 can change due to a transition from the observation angle to the fourth observation angle. Alternatively or additionally, the size of the submotifs 50 can change due to a transition to the fourth observation angle. Alternatively or additionally, the area of the submotifs 50 can change due to a transition to the fourth observation angle. Alternatively or additionally, the shape of the submotifs 50 can change due to a transition to the fourth observation angle.

The position of the main motif 30 could change due to a transition from the arbitrary (thus, for example, first, second, or further second) observation angle to the fourth observation angle. Alternatively or additionally, the size of the main motif 30 could change due to a transition to the fourth observation angle. Alternatively or additionally, the area of the main motif 30 could change due to a transition to the fourth observation angle. Alternatively or additionally, the shape of the main motif 30 could change due to a transition to the fourth observation angle.

However, the main motif 30 preferably remains essentially unchanged upon a tilt around the second axis. The tilt around the second axis preferably only changes the submotifs 50, which represent the main motif 50. The main motif 30 can in particular be changed by tilting around the first axis, as described above, starting from the third (or each third) observation angle.

The contour 32 of the main motif 30 can be perceptible as a continuous line. For example, the contour 32 of the main motif 30 can be a continuously brightly visible section of the main motif.

The contour 32 of the main motif 30 can be perceptible by an observer as an interrupted or noncontinuous line. For example, the contour 32 of the main motif 30 can have alternatingly brightly perceptible sections 36 and darkly perceptible sections 38.

The proportion of darkly perceptible sections 38 in the contour 32 at the third observation angle can be equal to the proportion of darkly perceptible sections 38 in the contour 32 at the fourth observation angle.

The proportion of darkly perceptible sections 38 in the contour 32 at the third observation angle can be greater than the proportion of darkly perceptible sections 38 in the contour 32 at the fourth observation angle.

The proportion of darkly perceptible sections 38 in the contour 32 at the third observation angle can be less than the proportion of darkly perceptible sections 38 in the contour 32 at the fourth observation angle.

The proportion of brightly perceptible sections 36 in the contour 32 at the third observation angle can be equal to the proportion of brightly perceptible sections 36 in the contour 32 at the fourth observation angle.

The proportion of brightly perceptible sections 36 in the contour 32 at the third observation angle can be greater than the proportion of brightly perceptible sections 36 in the contour 32 at the fourth observation angle.

The proportion of brightly perceptible sections 36 in the contour 32 at the third observation angle can be less than the proportion of brightly perceptible sections 36 in the contour 32 at the fourth observation angle.

The submotifs 50 can be visible spaced apart in the motif region 20. A gap 35 can be present between two adjacent submotifs 50.

The longitudinal extension of a gap 35 between two adjacent submotifs 50 at the third observation angle can be equal to the longitudinal extension of the gap between the adjacent submotifs at the fourth observation angle.

The longitudinal extension of a gap 35 between two adjacent submotifs 50 at the third observation angle can be less than the longitudinal extension of the gap between the adjacent submotifs at the fourth observation angle.

The longitudinal extension of a gap 35 between two adjacent submotifs 50 at the third observation angle can be greater than the longitudinal extension of the gap between the adjacent submotifs at the fourth observation angle.

The submotif shape 51 of the submotifs 50 at the third observation angle can correspond to the submotif shape 51 of the submotifs 50 at the fourth observation angle.

The main motif shape 31 of the main motif 30 at the third observation angle can correspond to the main motif shape 31 of the main motif 30 at the fourth observation angle.

Figure 13C:
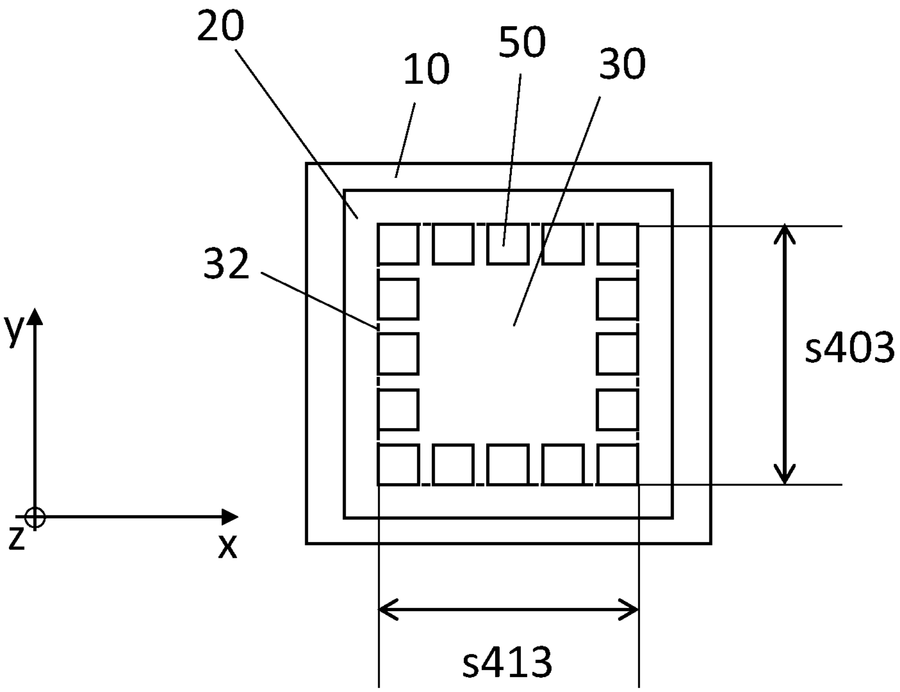
FIG. 13*c* shows the security element 10 having submotifs 50 at the observation angle having dimensions s403 and s413.
Figure 13D:
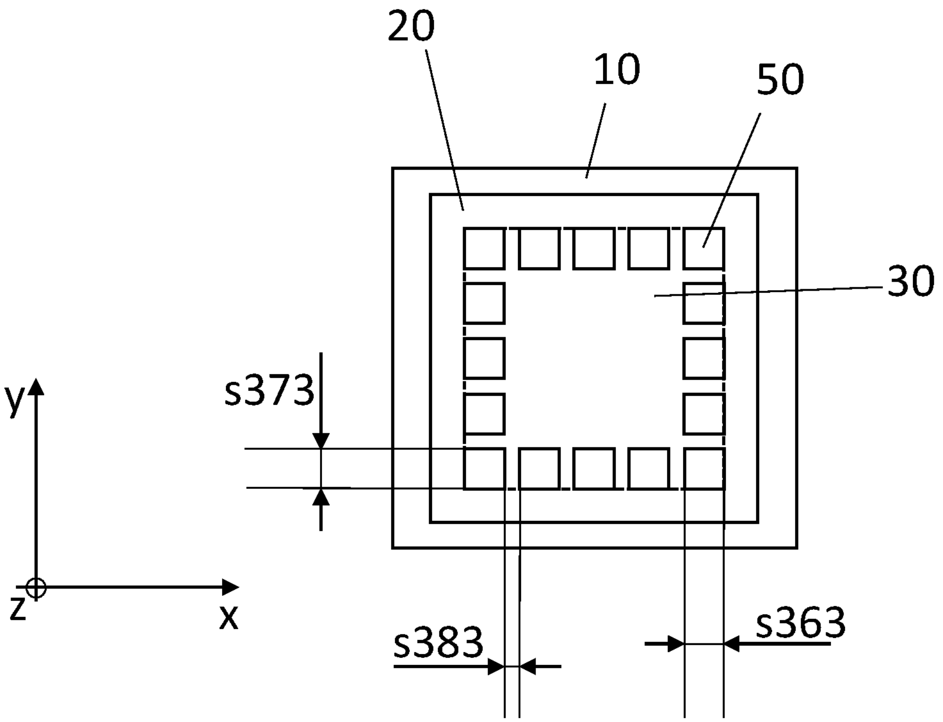
FIG. 13*d* shows the security element 10 having submotifs 50 at the observation angle having dimensions s363, s373, and s383.
Figure 13E:
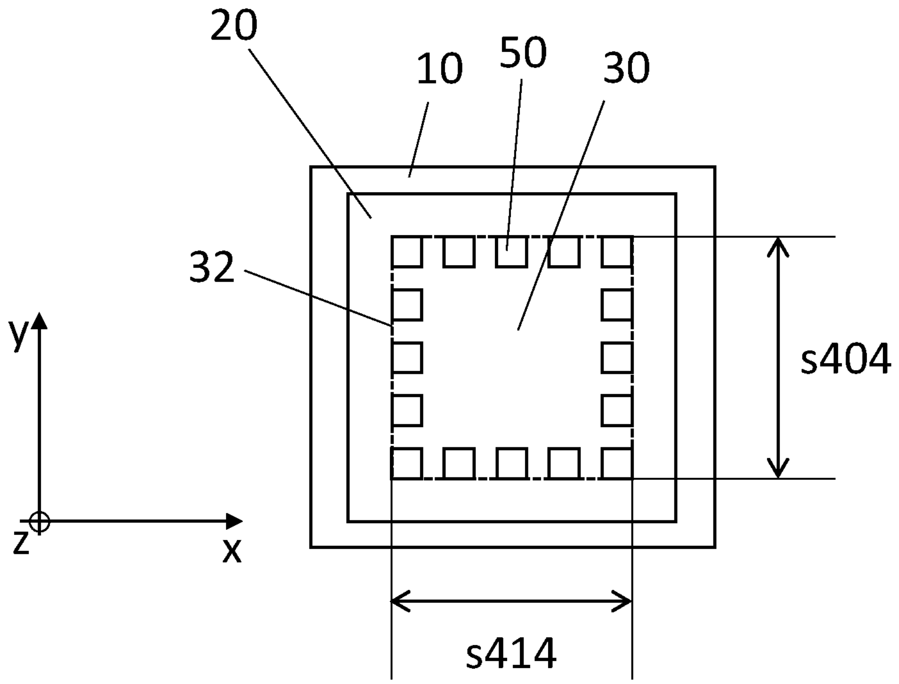
FIG. 13*e* shows the security element 10 having submotifs 50 at the further observation angle having dimensions s404, and s414.

FIG. 13*c* shows a security element 10 at the third observation angle and FIG. 13*e* shows the security element 10 at the fourth observation angle.

The main motif 30 can have a width s413 at the third observation angle. The main motif 30 can have a width s414 at the fourth observation angle. The width can be visible in the x direction (in the direction of the x axis). The width can be the maximum visible extension of the main motif 30 in the x direction. The main motif 30 can be delimited in the x direction by the contour 32 of the main motif 30.

The main motif 30 can have a height s403 at the third observation angle. The main motif 30 can have a height s404 at the fourth observation angle. The height can be visible in the y direction (in the direction of the y axis). The height can be the maximum visible extension of the main motif 30 in the y direction. The main motif 30 can be delimited in the y direction by the contour 32 of the main motif 30.

The width s413 of the main motif 30 at the third observation angle can be equal to the width s414 of the main motif 30 at the fourth observation angle.

The width s413 of the main motif 30 at the third observation angle can be less than the width s414 of the main motif 30 at the fourth observation angle.

The width s413 of the main motif 30 at the third observation angle can be greater than the width s414 of the main motif 30 at the fourth observation angle.

The height s403 of the main motif 30 at the third observation angle can be equal to the height s404 of the main motif 30 at the fourth observation angle.

The height s403 of the main motif 30 at the third observation angle can be less than the height s404 of the main motif 30 at the fourth observation angle.

The height s403 of the main motif 30 at the third observation angle can be greater than the height s404 of the main motif 30 at the fourth observation angle.

A ratio between the width s413 and the height s403 at the third observation angle can be essentially equal (±10%) to a ratio between the width s414 and the height s404 at the fourth observation angle.

Figure 13F:
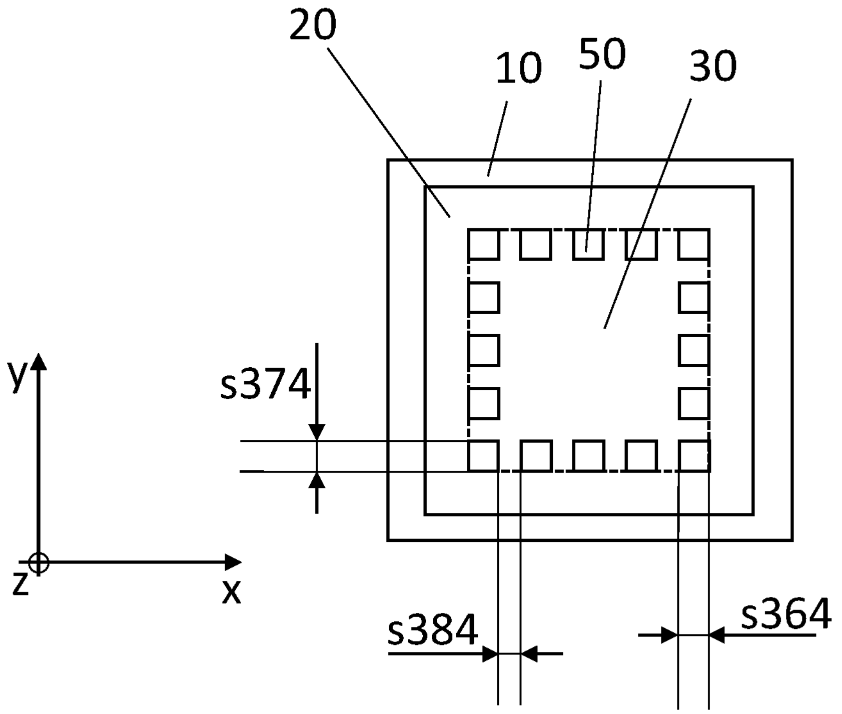
FIG. 13*f* shows the security element 10 having submotifs 50 at the further observation angle having dimensions s364, s374, and s384.

FIG. 13*d* shows a security element 10 at the third observation angle and FIG. 13*f* shows the security element 10 at the fourth observation angle.

A submotif 50 at the third observation angle can have a width s363. A submotif 50 at the fourth observation angle can have a width s364. The width can be visible in the x direction (in the direction of the x axis). The width can be the maximum visible extension of the submotif 50 in the x direction.

The submotif 50 at the third observation angle can have a height s373. The submotif 50 at the fourth observation angle can have a height s374. The height can be visible in the y direction (in the direction of the y axis). The height can be the maximum visible extension of the submotif 50 in the y direction.

The width s363 of a submotif 50 at the third observation angle can be equal to the width s364 of the submotif 50 at the fourth observation angle.

The width s363 of a submotif 50 at the third observation angle can be less than the width s364 of the submotif 50 at the fourth observation angle.

The width s363 of a submotif 50 at the third observation angle can be greater than the width s364 of the submotif 50 at the fourth observation angle.

The height s373 of a submotif 50 at the third observation angle can be equal to the height s374 of the submotif 50 at the fourth observation angle.

The height s373 of a submotif 50 at the third observation angle can be less than the height s374 of the submotif 50 at the fourth observation angle.

The height s373 of a submotif 50 at the third observation angle can be greater than the height s374 of the submotif 50 at the fourth observation angle.

There can be a spacing s383 between two adjacent submotifs 50 at the third observation angle. There can be a spacing s384 between two adjacent submotifs 50 at the fourth observation angle. The spacing can be between each of the submotifs 50.

The spacing s383 between two adjacent submotifs 50 at the third observation angle can be equal to the spacing s384 between two adjacent submotifs 50 at the fourth observation angle.

The spacing s383 between two adjacent submotifs 50 at the third observation angle can be less than the spacing s384 between two adjacent submotifs 50 at the fourth observation angle.

The spacing s383 between two adjacent submotifs 50 at the third observation angle can be greater than the spacing s384 between two adjacent submotifs 50 at the fourth observation angle.

A ratio between the width s363 and the height s373 of a submotif 50 at the third observation angle can be essentially equal (±10%) to a ratio between the width s364 and the height s374 of a submotif 50 at the fourth observation angle.

In general, a spacing can be the shortest distance between objects (for example between two submotifs) in one direction, preferably in the x direction or in the y direction.

Lesser or smaller can mean less by at least 100 μm or smaller by at least 100 μm. Lesser or smaller can mean less between 100 μm and 500 μm or smaller between 100 μm and 500 μm.

Larger can mean larger by at least 100 μm. Larger can mean larger between 100 μm and 500 μm.

Equal can mean a deviation of at most ±10%, preferably at most ±5%, more preferably ±3%, more preferably ±1%.

In general, each of the submotifs 50 of a main motif 30 can have the features which are disclosed in consideration of one submotif 50. Each of the sub-submotifs 70 of a main motif 30 or a submotif 50 can essentially have the features which are disclosed in consideration of a sub-submotif 70.

The invention claimed is:

1. An optically variable security element comprising a motif region, wherein:

an optically variable main motif having a main motif shape is visible to an observer in the motif region at at least one first observation angle, the optically variable main motif includes substructures visible to the observer, the substructures are submotifs visible to the observer and each submotif has a submotif shape, and each submotif has an identical submotif shape arranged as a smaller scale of the main motif shape;

wherein a main ratio between width and height of the main motif is equal to a sub-ratio between width and height of each submotif;

wherein the optically variable main motif has a contour which surrounds an inner section of the optically variable main motif;

wherein the main motif is differently visible depending on the observation angle, and at at least one second observation angle which is different from the first observation angle, the optically variable main motif is visible with a smaller or larger area, at another position, and/or with another degree of rotation than at the first observation angle.

2. The optically variable security element according to claim 1, wherein the submotifs are visible along the contour of the main motif or wherein the contour of the main motif is formed by the submotifs.

3. The optically variable security element according to claim 1, wherein the contour of the main motif is visible to the observer by way of alternatingly bright and dark sections.

4. The optically variable security element according to claim 1, wherein the optically variable main motif comprises submotifs visible at the second observation angle, wherein an area of each of the submotifs at the second observation angle is equal to, less than, or greater than an area of each of the submotifs at the first observation angle.

5. The optically variable security element according to claim 1, wherein the optically variable main motif comprises submotifs visible at the second observation angle, wherein a number of the submotifs at the second observation angle is less than, equal to, or greater than a number of the submotifs at the first observation angle.

6. The optically variable security element according to claim 1, wherein the optically variable main motif has a main motif shape at the second observation angle, wherein the main motif shape of the main motif at the second observation angle corresponds to the main motif shape of the main motif at the first observation angle.

7. The optically variable security element according to claim 1, wherein each of the submotifs comprises sub-submotifs and wherein each of the submotifs has a contour which surrounds an inner section of the respective submotif.

8. The optically variable security element according to claim 7, wherein the sub-submotifs are visible along the contour of the respective submotif or wherein the contour of the respective submotif is formed by the sub-submotifs.

9. The optically variable security element according to claim 7, wherein each of the sub-submotifs has a sub-submotif shape and the sub-submotif shape corresponds to the submotif shape and/or the main motif shape.

10. The optically variable security element according to claim 1, wherein the optically variable security element defines an x-y plane having an x axis and a y axis, wherein a transition from the first observation angle to at least one second observation angle can be carried out by tilting the optically variable security element around the x axis.

11. The optically variable security element according to claim 10, wherein a transition from a third observation angle to at least one fourth observation angle can be carried out by tilting the optically variable security element around the y axis, wherein the submotifs differ at the third observation angle and the fourth observation angle, wherein the main motif changes upon a tilt around the x axis and does not change upon a tilt around the y axis; and/or the submotifs differ in size and/or in a ratio of dark to bright sections at the third observation angle and the fourth observation angle, wherein furthermore a total area of the submotifs and/or an area of the submotifs remains equal.

12. The optically variable security element according to claim 1, wherein the optically variable security element comprises an arrangement of microreflectors which are reflective and generate the main motif and the submotifs for the observer depending on the observation angle, wherein the microreflectors are micromirrors; and/or the arrangement comprises a relief structure having a reflection-increasing a metal coating, an optically variable coating, optically variable multilayer structure, or an HRI coating; and/or the arrangement comprises an embossed embossing lacquer layer.

13. The optically variable security element according to claim 1, wherein each of the submotifs at the first observation angle, has a maximum width of at most 5.0 mm.

14. A value document having an optically variable security element according to claim 1.

15. An optically variable security element having a motif region, wherein an optically variable main motif having a main motif shape is visible to an observer in the motif region at at least one first observation angle, the optically variable main motif comprises substructures visible to the observer, the substructures are submotifs visible to the observer and each submotif has a submotif shape, the submotifs have the same submotif shape, and the submotif shape corresponds to the main motif shape;

wherein each of the submotifs comprises sub-submotifs, and wherein each of the submotifs has a contour which surrounds an inner section of the respective submotif.

16. The optically variable security element according to claim 15, wherein the submotifs are visible along the contour of the main motif or wherein the contour of the main motif is formed by the submotifs.

17. The optically variable security element according to claim 15, wherein each of the submotifs at the first observation angle, has a maximum width of 5.0 mm.

18. An optically variable security element having a motif region, wherein an optically variable main motif having a main motif shape is visible to an observer in the motif region at at least one first observation angle, the optically variable main motif comprises substructures visible to the observer, the substructures are submotifs visible to the observer and each submotif has a submotif shape, the submotifs have the same submotif shape, and the submotif shape corresponds to the main motif shape;

wherein the optically variable security element defines an x-y plane having an x axis and a y axis, wherein a transition from the first observation angle to at least one second observation angle can be carried out by tilting the optically variable security element around the x axis, wherein a transition from a third observation angle to at least one fourth observation angle can be carried out by tilting the optically variable security element around the y axis, wherein the submotifs differ at the third observation angle and the fourth observation angle, wherein the main motif changes upon a tilt around the x axis and does not change upon a tilt around the y axis; and/or the submotifs differ in size and/or in a ratio of dark to bright sections at the third observation angle and the fourth observation angle.

19. The optically variable security element according to claim 18, wherein the optically variable security element comprises an arrangement of microreflectors which are reflective and generate the main motif and the submotifs for the observer depending on the observation angle, wherein the microreflectors are micromirrors; and/or the arrangement comprises a relief structure having a reflection-increasing a metal coating, an optically variable coating, optically variable multilayer structure, or an HRI coating; and/or the arrangement comprises an embossed embossing lacquer layer.

20. The optically variable security element according to claim 18, wherein each of the submotifs at the first observation angle, has a maximum width of at most 5.0 mm.

* * * * *